(12) United States Patent
Li et al.

(10) Patent No.: US 10,454,632 B2
(45) Date of Patent: Oct. 22, 2019

(54) METHOD AND APPARATUS FOR HYBRID AUTOMATIC REPEAT REQUEST TRANSMISSION

(71) Applicant: Samsung Electronics Co., Ltd., Suwon-si, Gyeonggi-do (KR)

(72) Inventors: Yingyang Li, Beijing (CN); Yi Wang, Beijing (CN); Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/539,922

(22) PCT Filed: Dec. 28, 2015

(86) PCT No.: PCT/KR2015/014324
§ 371 (c)(1),
(2) Date: Jun. 26, 2017

(87) PCT Pub. No.: WO2016/105173
PCT Pub. Date: Jun. 30, 2016

(65) Prior Publication Data
US 2017/0346606 A1 Nov. 30, 2017

(30) Foreign Application Priority Data

Dec. 26, 2014 (CN) .......................... 2014 1 0831976
May 11, 2015 (CN) .......................... 2015 1 0236719
Oct. 19, 2015 (CN) .......................... 2015 1 0680469

(51) Int. Cl.
*G08C 25/02* (2006.01)
*H04L 1/18* (2006.01)

(52) U.S. Cl.
CPC ............ *H04L 1/1893* (2013.01); *H04L 1/189* (2013.01); *H04L 1/1812* (2013.01);
(Continued)

(58) Field of Classification Search
CPC ... H04L 1/1893; H04L 1/1822; H04L 1/1887; H04L 1/1812
See application file for complete search history.

(56) References Cited

U.S. PATENT DOCUMENTS

| 2014/0064237 A1 | 3/2014 | Lee et al. |
| 2014/0204892 A1 | 7/2014 | Oizumi et al. |

(Continued)

OTHER PUBLICATIONS

CATT, "Discontinuous transmission on Scell for LAA", Nov. 17-21, 2014, 6.3.2.2, 3GPP TSG RAN WG1 Meeting #79, R1-144626.

(Continued)

*Primary Examiner* — Samir W Rizk
(74) *Attorney, Agent, or Firm* — Jefferson IP Law, LLP

(57) ABSTRACT

The present application discloses a method and apparatus for a hybrid automatic repeat request (HARQ) transmission. An embodiment of the HARQ transmission method for the communication apparatus comprises: receiving configuration information related to a cross-carrier HARQ transmission from a base station, an initial transmission and a re-transmission of the HARQ transmission processable on different physical component carriers; receiving downlink control information from the base station, the downlink control information including control information for the cross-carrier HARQ transmission; and performing the cross-carrier HARQ transmission according to the configuration information and the downlink control information. By using the embodiments of the present invention, the HARQ transmission for the same data on a plurality of physical component carriers can be realized, and thus the effectiveness of the HARQ transmission is improved.

20 Claims, 8 Drawing Sheets

(52) U.S. Cl.
CPC .......... *H04L 1/1822* (2013.01); *H04L 1/1861* (2013.01); *H04L 1/1887* (2013.01)

(56) References Cited

U.S. PATENT DOCUMENTS

| | | | |
|---|---|---|---|
| 2014/0211732 A1* | 7/2014 | Nogami | H04L 5/001 |
| | | | 370/329 |
| 2015/0264690 A1* | 9/2015 | McNamara | H04L 5/0039 |
| | | | 370/329 |
| 2016/0323854 A1* | 11/2016 | Gao | H04L 1/1822 |
| 2017/0311337 A1* | 10/2017 | Mo | H04W 72/12 |

OTHER PUBLICATIONS

ZTE, "HARQ related issues for Licensed-assisted access using LTE", Nov. 17-21, 2014, pp. 1-4, 6.3.2.2, 3GPP TSG RAN WG1 Meeting #79, R1-144829.

CMCC, "Discussion on possible solutions for LAA", Nov. 17-21, 2014, pp. 1-6, 6.3.2.2, 3GPP TSG RAN WG1 Meeting #79, R1-144940.

* cited by examiner

[Fig. 1]
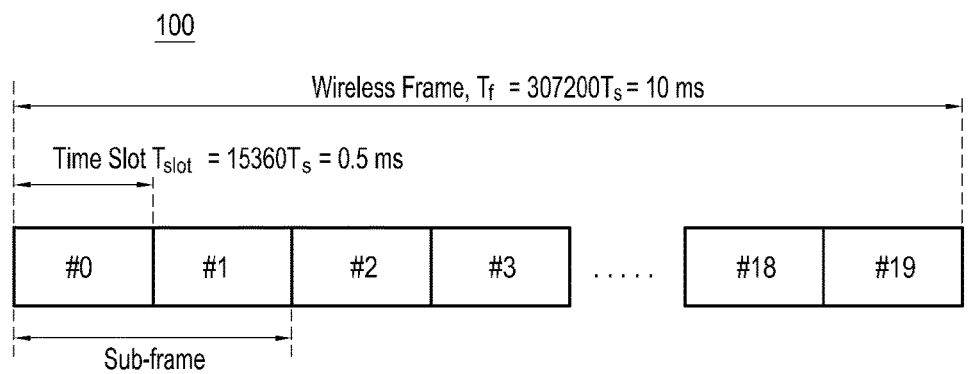

[Fig. 2]
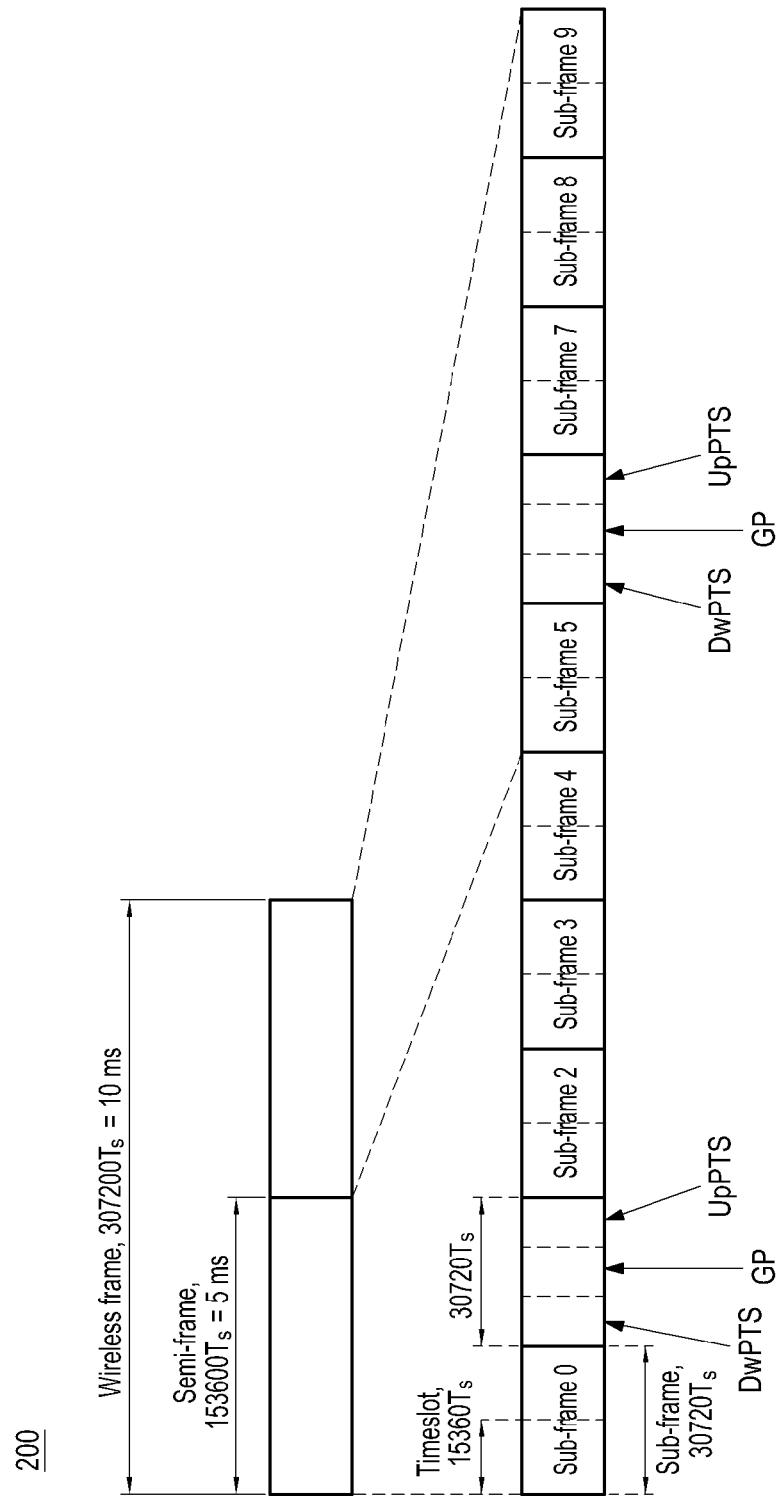

[Fig. 3]
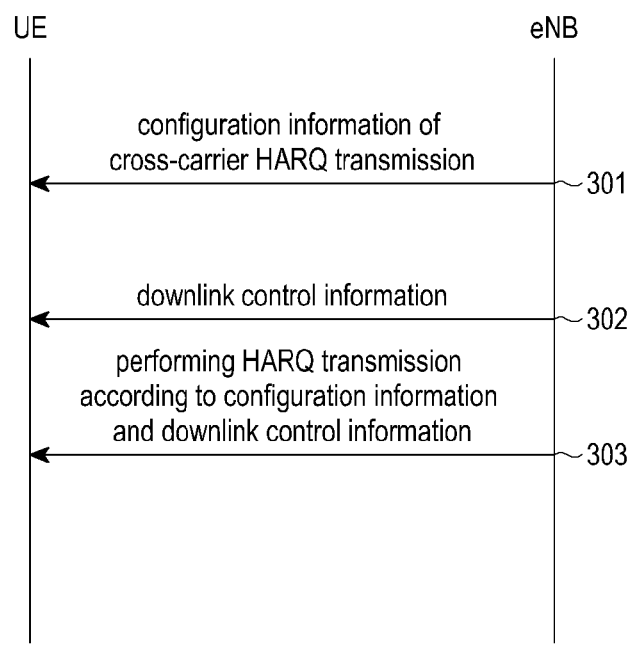

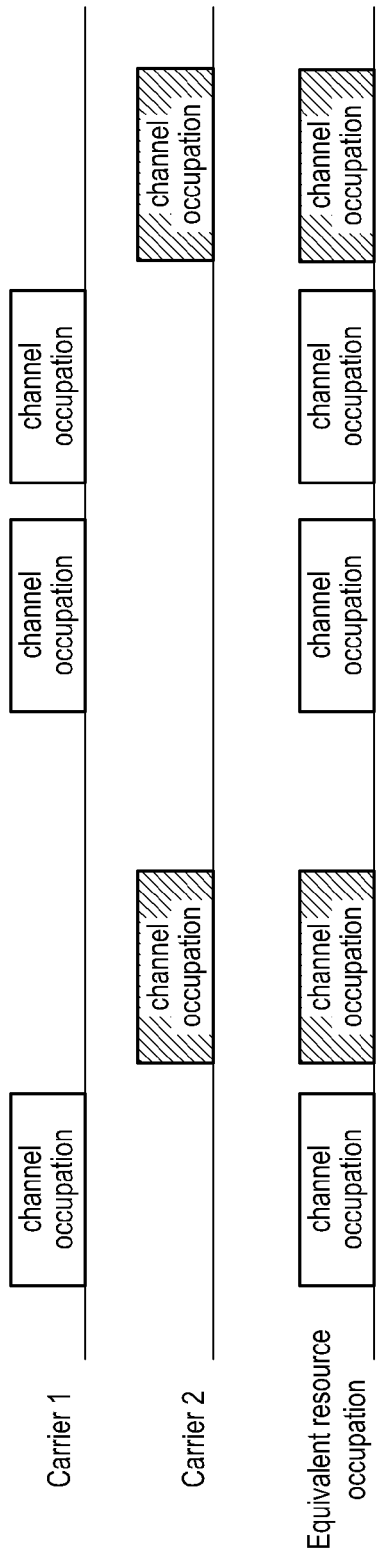

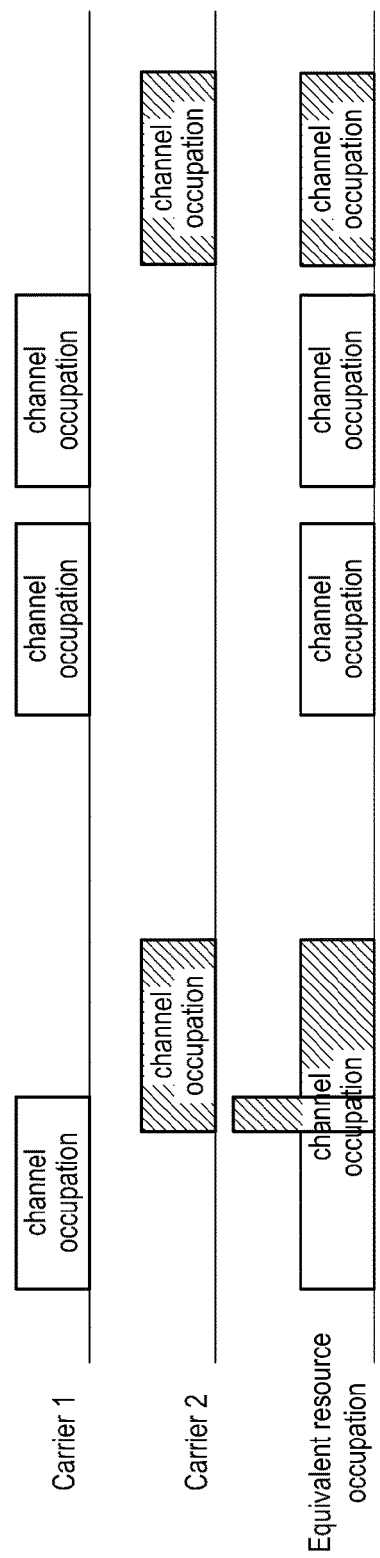
[Fig. 5]

[Fig. 6]
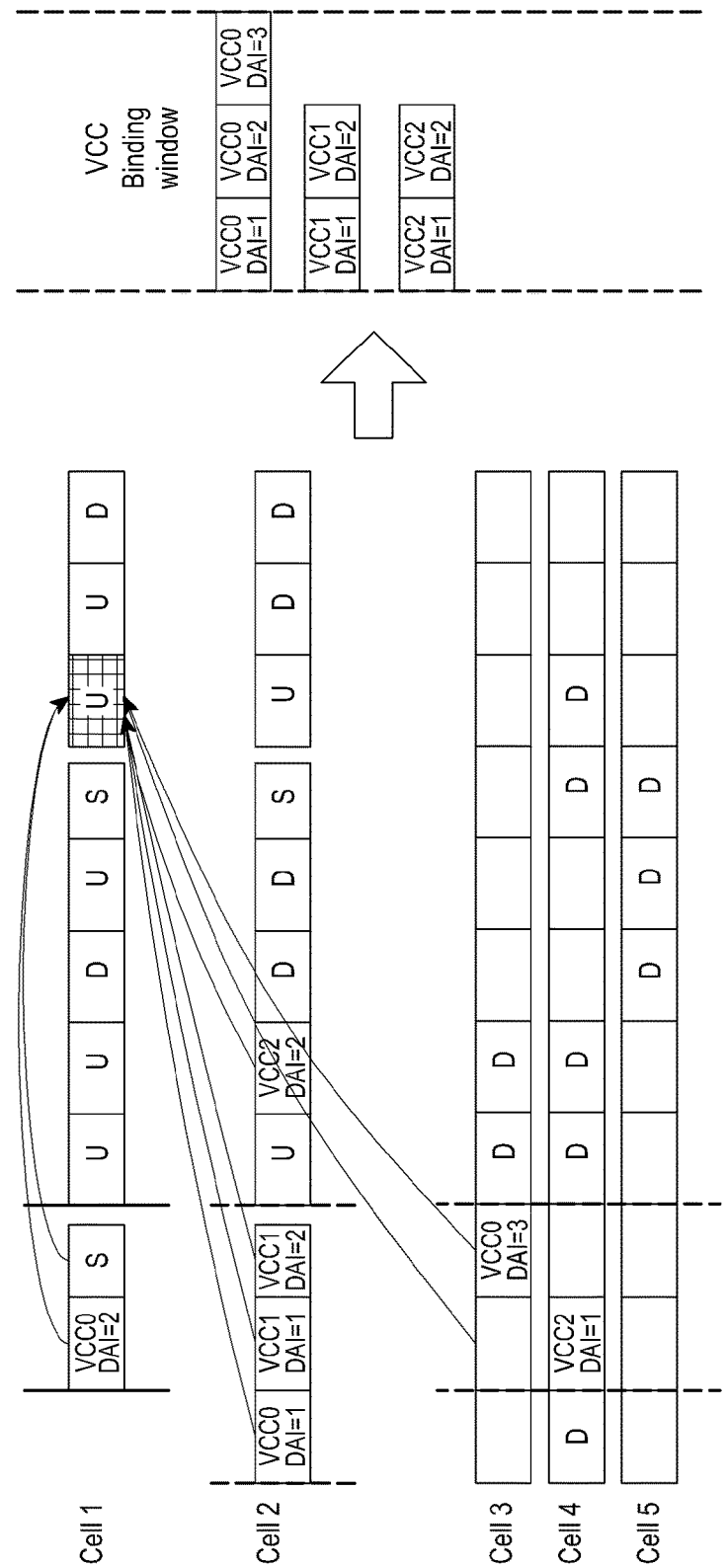

[Fig. 7]
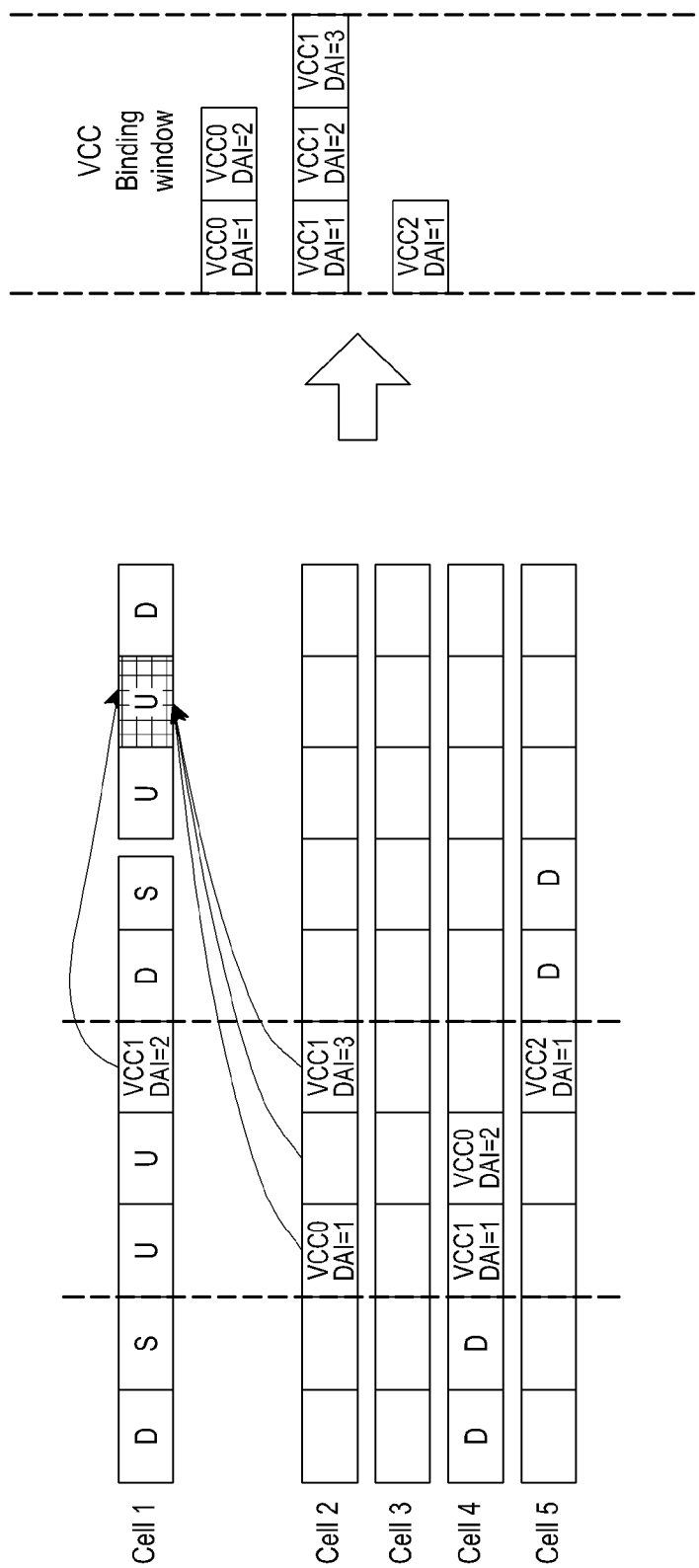

[Fig. 8]
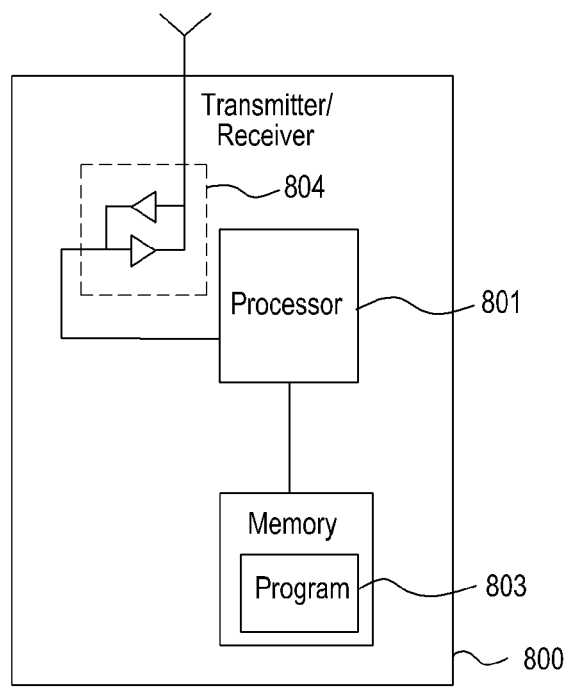

METHOD AND APPARATUS FOR HYBRID AUTOMATIC REPEAT REQUEST TRANSMISSION

CROSS-REFERENCE TO RELATED APPLICATION(S)

This application is a U.S. National Phase application under 35 U.S.C. § 371 of an International application filed on filed on Dec. 28, 2015 and assigned application number PCT/KR2015/014324, which claimed the benefit of a Chinese Patent application filed on Dec. 26, 2014 in the Chinese Intellectual Property Office and assigned Serial number 201410831976.3, and Chinese Patent Application filed on May 11, 2015 in the Chinese Intellectual Property Office and assigned Serial number 201510236719.X, and Chinese Patent Application filed on Oct. 19, 2015 in the Chinese Intellectual Property Office and assigned Serial number 201510680469.9, the entire disclosure each of which are hereby incorporated by reference.

TECHNICAL FIELD

The present disclosure relates to a technical field of wireless communication technology, in particular, to a Hybrid Automatic Repeat Request (HARQ) transmission, especially to a method, a communication apparatus and a base station for performing the HARQ transmission in a Long Term Evolution (LTE) system.

BACKGROUND ART

With a continuous development in cellular wireless mobile communication systems, there are more and more mobile users. Such a high speed development brings opportunities as well as pressures and challenges. Problems such as finite spectrum resources, sharply increasing volume of business, too large load of the base station, insufficient coverage area, etc., all need to be solved by researching new communication technologies.

The Long Term Evolution (LTE) system of the 3rd Generation Partnership Project (3GPP) Organization for Standardization supports two duplex ways, that is, Frequency Division Duplex (FDD) and Time Division Duplex (TDD). As shown in FIG. 1, FIG. 1 is a schematic diagram of an FDD wireless frame configuration in prior art. For a FDD system, each wireless frame has a length of 10 ms and includes 10 sub-frames each having a length of 1 ms. Particularly, the sub-frame is composed of two continuous time slots each having a length of 0.5 ms, that is, the kth sub-frame includes the time slots 2k and 2k+1, where k=0, 1, . . . 9. As shown in FIG. 2, FIG. 2 is a schematic diagram of a TDD wireless frame configuration in prior art. For a TDD system, each wireless frame of 10 ms is equally divided into two half frames each having a length of 5 ms. Particularly, each half frame includes 8 sub-frames each having a length of 0.5 ms and 3 special domains, that is, Downlink Pilot Time Slot (DwPTS), Guard Period (GP), and Uplink Pilot Time Slot (UpPTS), wherein the sum of the lengths of the 3 special domains is 1 ms. Each sub-frame is composed of two continuous time slots, that is, the kth sub-frame includes the time slots 2k and 2k+1, where k=0, 1, . . . 9. Downlink Transmission Time Interval (TTI) is defined in a sub-frame.

During the configuration of the TDD wireless frame, 7 kinds of uplink and downlink configurations are suppotive, as shown in table 1. In table 1, D represents the downlink sub-frame, U represents the uplink sub-frame, and S represents the special sub-frame including the above 3 special domains.

TABLE 1

| Serial No. of configuration | period of transformation point | sub-frame No. | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

Particularly, the first n Orthogonal Frequency Division Multiplexing (OFDM) symbols of each downlink sub-frame can be used to transmit the downlink controlling information. The downlink controlling information includes Physical Downlink Control Channel (PDCCH) and other controlling information, where n equals to 0, 1, 2, 3, or 4. The rest OFDM symbols can be used to transmit Physical Downlink Shared Channel (PDSCH) or Enhanced PDCCH (EPDCCH). In the LTE system, PDCCH and EPDCCH carry Downlink Control Information (DCI) of the uplink or downlink channel resources, which are referred to as Downlink Grant (DL Grant) and Uplink Grant (UL Grant), respectively. In the LTE system, the DCI of different User Equipments (UE) are transmitted individually and respectively, and the DL Grant and the UL Grant are transmitted individually and respectively.

In an enhanced system of the LTE system, a greater operation bandwidth is obtained by combining a plurality of Component Carriers (CC). That is to say, Carrier Aggregation (CA) is used to constitute the downlink and the uplink of the communication system, thereby supporting a greater transmission rate. Here, the CC combined together not only can employ the same duplex way, i.e., all the cells are FDD cells or TDD cells, but also can use different duplex ways, i.e., the FDD cells and the TDD cells both exist. For a UE, the base station can be configured to operate in a plurality of cells, one of which is a primary cell (Pcell), and the others are referred to as secondary cells (Scell). In the above existing LTE CA system, both the HARQ re-transmission and an initial transmission for the same Transport Block (TB) are limited to the same CC. For the LTE CA system, Channel State Information (CSI) and Hybrid Automatic Repeat Request Acknowledgement (HARQ-ACK) transmitted based on Physical Uplink Control Channel (PUCCH) are performed only on Pcell. This limits the flexibility of the base station scheduling to some extent. In order to adapt to the requirements for evolution of the LTE system, it is needed to improve the effectiveness of HARQ transmission in a new scene. For example, in configuring cells having unlicensed bands for UE, the cells having the unlicensed bands can be generally configured as Scells of UE.

The unlicensed bands generally have been allocated for some other usages, such as the radar system and/or the Wireless Fidelity (WiFi) system of 802.11 series. The WiFi system of 802.11 series operates based on a mechanism of Carrier Sense Multiple Access/Collision Avoidance (CSMA/CA). A Station (STA) must detect the wireless channel before transmitting signals, and the wireless channel can be occupied to transmit signals only if the wireless channel has been idle for a period of time. The STA can simultaneously use two mechanisms to determine the state of the wireless channel. On one hand, the STA can use a Carrier Sensing technology to detect the wireless channel actually. When other STA signals are detected or the detected signal power exceeds the set threshold, it is determined that the wireless channel is busy. At this time, a Clear Channel Assessment (CCA) report reported by a physical layer module of STA to its high level module indicates that the wireless channel is busy. On the other hand, the WiFi system of 802.11 series also introduces the virtual carrier sense technology, that is, Network Allocation Vector (NAV). A duration domain is included in each 802.11 frame, and the NAV value set according to the duration domain confirms that signals can not be transmitted on the wireless channel, wherein NAV is the time indicating the wireless channel needs to be reserved.

Further, a plurality of LTE systems can also be deployed simultaneously in the unlicensed bands. For example, the plurality of LTE systems may be affiliated to different operators, respectively. In order to keep the description simple, hereinafter, LTE apparatus is used to refer to base station and UE in general. In order to avoid interference with other LTE system apparatuses or other wireless system apparatuses, the LTE system apparatus first needs to detect the state of the channel before transmitting signals, the apparatus can occupy the channel only when the condition of occupying the channel is satisfied. Furthermore, the apparatus may occupy the channel for one or more sub-frames, and then the channel must be released, thereby giving opportunities for other apparatuses to occupy the channel.

By using the above method of vying for resources, a LTE apparatus has to release the channel resource after occupying the channel and transmiting data. When the number of apparatuses participating competition on the component carrier is relatively large, it may take the LTE apparatus a relatively long time to re-seize the channel and then make a HARQ re-transmission for data that were not unsuccessfully transmitted in the last time. This limits the effectiveness of HARQ transmission to some extent.

DISCLOSURE

Technical Solution

In order to sufficiently utilize the HARQ transmission to improve the performance of data transmission, for a TB that is not transmitted successfully, it is desired to perform a quick re-transmission on another component carrier. In order to solve above problem, the present application provides a method, a base station and a communication apparatus for the HARQ transmission.

In the first aspect, a hybrid automatic repeat request (HARQ) transmission method for a communication apparatus is provided. The method comprises: receiving configuration information related to a cross-carrier HARQ transmission from a base station, an initial transmission and a re-transmission of the HARQ transmission processable on different physical component carriers; receiving downlink control information from the base station, the downlink control information including control information for the cross-carrier HARQ transmission; and performing the cross-carrier HARQ transmission according to the configuration information and the downlink control information.

In some embodiments, the configuration information indicates that that the cross-carrier HARQ transmission is processed based on virtual component carriers (VCC), wherein the communication apparatus is configured with N physical component carriers and M VCCs, each of the M VCCs is used to identify data transmission of one or more available sub-frames of a group of physical component carriers among the N physical component carriers, the data transmission identified by a VCC can be performed on any one of a group of physical component carriers corresponding to the VCC, M and N are positive integers and M is less than N.

In some embodiments, the performing the HARQ transmission according to the configuration information and the downlink control information comprises: determining an index of the VCC corresponding to the data transmission based on VCC index information received from the base station. The VCC index information indicates any one of: a VCC corresponding to data transmission in a scheduled sub-frame; and a VCC corresponding to data transmission in continuous sub-frames of a physical component carrier.

In some embodiments, the number of bits used by the VCC index information is any one of: $\lceil \log_2(M) \rceil$, where M is the number of the VCCs configured in the configuration information; and $\lceil \log_2(M_{max}) \rceil$, where $M_{max}$ is the maximum number of the VCCs needing support.

In some embodiments, he performing the HARQ transmission according to the configuration information and the downlink control information comprises: processing soft buffer based on the VCC.

In some embodiments, the processing soft buffer based on the VCC comprises at least one of: processing rate match according to the maximum number $M_{DL\_HARQ}$ of HARQ processes of the VCC and the number of transmission blocks (TB) supported by the VCC in a sub-frame; and caching the soft bit according to the number M of VCCs, the maximum number $M_{DL\_HARQ}$ of HARQ processes of the VCC and the number of TBs supported by VCC in a sub-frame.

In some embodiments, the maximum number $M_{DL\_HARQ}$ of HARQ processes of the VCC is determined by at least one of the following: receiving a high layer signaling from the base station, wherein the high layer signaling configures the maximum number $M_{DL\_HARQ}$ of HARQ processes of each respective VCC; receiving a high layer signaling from the base station, wherein the high layer signaling configures the maximum number $M_{DL\_HARQ}$ of HARQ processes and applies the maximum number $M_{DL\_HARQ}$ of HARQ processes to all VCCs; pre-defining the maximum number $M_{DL\_HARQ}$ of HARQ processes of each VCC as a fixed value; determining the maximum number $M_{DL\_HARQ}$ of HARQ processes of VCC mapped by the physical component carrier according to the maximum number of HARQ processes of the physical component carrier; and determining the maximum number $M_{DL\_HARQ}$ of HARQ processes of M VCCs sequentially according to the maximum number of HARQ processes of the first M physical component carriers among the N physical component carriers.

In some embodiments, the transmitted data are divided into several data groups, wherein all HARQ feedbacks of data in a data group are mapped onto the same physical component carrier for transmission.

In some embodiments, the data can be divided according to any one of: physical component carriers used for transmitting the data; and corresponding VCCs in transmitting the data.

In some embodiments, wherein the performing the HARQ transmission according to the configuration information and the downlink control information comprises: during downlink HARQ transmission, determining the number of bits of an HARQ-ACK information and determining a sequence of respective HARQ-ACK information according to the number of VCCs corresponding to a data group, the size of a VCC binding window of a sub-frame n for transmitting the HARQ-ACK information, and the number of TBs supported by VCC in a sub-frame.

In some embodiments, the determining the sequence of of the respective HARQ-ACK information comprises: sequencing the HARQ-ACK information according to the index sequence of the VCC; and sequencing several HARQ-ACK information aiming at the same VCC according to downlink allocation index (DAI) of the VCC, wherein DAI indentifies the sequence of a plurality of data transmissions scheduled on the VCC.

In some embodiments, the size of the VCC binding window of the sub-frame n for transmitting the HARQ-ACK information is determined according to any one of the following: determining the size of the VCC binding window according to a reference HARQ timing of the VCCs corresponding to the sub-frame n; and receiving the high layer signaling from the base station, wherein the high layer signaling configures the size of the VCC binding window.

In some embodiments, the reference HARQ timing of VCC is determined by any one of the following: receiving the high layer signaling from the base station, wherein the high layer signaling configures the reference HARQ timing of each respective VCC; receiving the high layer signaling from the base station, wherein the high layer signaling configures the reference HARQ timing and applies the reference HARQ timing to all VCCs; determining the reference HARQ timing of VCC mapped by the physical component carrier according to the reference HARQ timing of the physical component carrier; and determining the reference HARQ timing of M VCC sequentially according to the reference HARQ timing of the first M physical component carriers among the N physical component carriers.

In other embodiments, the configuration information indicates that the cross-carrier HARQ transmission is processed based on a combined HARQ process, wherein the communication apparatus is configured with N component carriers, which are divided into several groups of physical component carriers, and a set of combined HARQ processes is defined on each group of physical component carriers, the initial transmission and the re-transmission of each of the set of combined HARQ processes can be mapped to different physical component carriers of the groups of physical component carriers.

In some embodiments, the performing the HARQ transmission according to the configuration information and the downlink control information comprises: determining the HARQ process corresponding to the data transmission based on a combined HARQ process ID included in the downlink control information, wherein the number of bits used by the combined HARQ process ID is any one of: $\lceil \log_2(M_u) \rceil$, where $M_u$ is the number of the combined HARQ processes in the set of combined HARQ processes configured by the high layer signaling; and $\lceil \log_2(M_{u-max}) \rceil$, where $M_{u-max}$ is the maximum number of combined HARQ processes that need to be supported by the corresponding group of physical component carriers.

In some embodiments, the performing the HARQ transmission according to the configuration information and the downlink control information comprises: processing soft buffer with respect to each combined HARQ process, respectively.

In some embodiments, the processing soft buffer with respect to each combined HARQ process respectively comprises at least one of the following: processing rate match according to the maximum number $M_{DL\_uHARQ}$ of HARQ processes of a combined HARQ process and the number of TBs supported on a sub-frame of the physical component carrier to which the combined HARQ process is mapped; caching the soft bit according to the total number of combined HARQ processes of the N physical component carriers and the number of TBs supported on a sub-frame of the physical component carrier to which the combined HARQ process is mapped; and caching the soft bit according to the number G of the group of physical component carriers, the number $M_u$ of combined HARQ processes of the set to which a combined HARQ process belongs, and the number of TBs supported on a sub-frame of the physical component carrier to which the combined HARQ process is mapped.

In some embodiments, the maximum number $M_{DL\_HARQ}$ of HARQ processes of the combined HARQ process is determined by at least one of the following: receiving high layer signaling from the base station, wherein the high layer signaling configures the maximum number $M_{DL\_HARQ}$ of HARQ processes of each combined HARQ process, respectively; receiving high layer signaling from the base station, wherein the high layer signaling configures a maximum number $M_{DL\_uHARQ}$ of HARQ processes, and applies the maximum number $M_{DL\_uHARQ}$ of HARQ processes to all combined HARQ processes; pre-defining the maximum number $M_{DL\_HARQ}$ of HARQ processes of each combined HARQ process as a fixed value; determining according to the maximum number of HARQ processes of the reference HARQ timing of the physical component carrier to which current data transmission of the combined HARQ process is mapped; and determining according to the maximum number $M_{DL\_HARQ}$ of HARQ processes of the reference HARQ timing of the physical component carrier to which the initial transmission of current data of the combined HARQ process is mapped.

In the second aspect, a hybrid automatic repeat request (HARQ) transmission method for a base station is provided. The method comprises: transmitting configuration information of a cross-carrier HARQ transmission to a communication apparatus, an initial transmission and a re-transmission of the HARQ processable on on different physical component carriers; transmitting downlink control information to the communication apparatus, the downlink control information including the control information for the cross-carrier HARQ transmission; and performing the cross-carrier HARQ transmission according to the configuration information and the downlink control information.

In some embodiments, the configuration information indicates that the cross-carrier HARQ transmission is processed based on virtual component carriers (VCC), wherein the communication apparatus is configured with N physical component carriers and M VCCs, each of the M VCCs is used to identify data transmission of one or more available sub-frames of a group of physical component carriers among the N physical component carriers, the data transmission identified by a VCC can be performed on any one of a group of physical component carriers corresponding to the VCC, M and N are positive integers and M is less than N.

In other embodiments, the configuration information indicates that the cross-carrier HARQ transmission is processed based on a combined HARQ process, wherein the communication apparatus is configured with N component carriers, which are divided into several groups of physical component carriers, and a set of combined HARQ processes is defined on each group of physical component carriers, the initial transmission and the re-transmission of each of the set of combined HARQ processes can be mapped to different physical component carriers of the groups of physical component carriers.

In the third aspect, a method of processing the soft buffer, the method comprising: receiving configuration information for processing the soft bit cache from a base station; receiving downlink control information and accordingly receiving downlink data from the base station, and caching soft bits which receive wrong data.

In some embodiments, the configuration information for processing the soft bit cache comprises: for a group of CCs, configuring the maximum number of HARQ processes through high layer signalings respectively; or configuring the maximum number of HARQ processes by high layer signalings and applying to all data transmission of N CCs; or pre-defining the maximum number of HARQ processes as a fixed value; or determining the maximum number of HARQ processes according to a reference HARQ timing of the CC where data transmission exists.

In some embodiments, caching soft bits which receive wrong data comprises: processing a group of CCs according to the number of equivalent CCs, according to the sum of the equivalent number of CCs corresponding to N component carriers for processing the soft bit cache, and the maximum number of HARQ processes of the CC and the number of TBs supported on a sub-frame of the CC; or processing a group of CCs according to the number of TBs, according to the sum of the equivalent number of TBs corresponding to N component carriers for processing the soft bit cache in a sub-frame, and the maximum number of HARQ processes of the CC; or processing a group of CCs according to the number of TBs, according to the sum of the equivalent number of TBs corresponding to N component carriers for processing the soft bit cache in a sub-frame, and the maximum number of HARQ processes of the CC; or processing a group of CCs according to the number of equivalent HARQ processes, according to the sum of the equivalent number of HARQ processes of configured N component carriers for processing the soft bit cache, and the number of TBs supported on a sub-frame of the CC where data transmission exists; or processing a group of CCs according to the number of equivalent HARQ processes, according to the group number of the divided groups of physical component carriers, the equivalent number of HARQ processes in a group for processing the soft bit cache, and the number of TBs supported on a sub-frame of the CC where data transmission exists; or processing a group of CCs according to the number of equivalent TBs, according to the sum of the equivalent number of TBs of configured N component carriers for processing the soft bit cache; or processing a group of CCs according to the number of equivalent TBs, according to the sum of the equivalent number of TBs of configured N component carriers for processing the soft bit cache; or processing a group of CCs according to the number of equivalent TBs, according to the group number G of the divided groups of physical component carriers and the equivalent number $B_g$ of TBs in a group for processing the soft bit cache.

In the fourth aspect, a communication apparatus is provided. The communication apparatus comprises a receiver, a transmitter and a processor. The receiver is configured to receive configuration information of a cross-carrier HARQ transmission from a base station. An initial transmission and a re-transmission of the HARQ are processable on different physical component carriers. The receiver is further configured to receive downlink control information from the base station, and the downlink control information includes control information for the cross-carrier HARQ transmission. The processor is configured to control the receiver and the transmitter to perform the cross-carrier HARQ transmission according to the configuration information and the downlink control information.

In the fifth aspect, a base station is provided. The base station comprises a receiver, a transmitter and a processor. The processor is configured to determine configuration information of a cross-carrier HARQ transmission, an initial transmission and a re-transmission of the HARQ are processable on different physical component carriers. The transmitter is configured to transmit the configuration information of the cross-carrier HARQ transmission to a communication apparatus. The transmitter is further configured to transmit downlink control information to the communication apparatus. The processor is further configured to control the receiver and the transmitter to perform the HARQ transmission according to the configuration information and the downlink control information.

It should be noted that corresponding embodiments of the first aspect can also be applied to the second, third and fourth aspects.

According to the particular embodiments of the technology described in the present application, the HARQ transmission for the same data on a plurality of physical component carriers can be realized, thereby the effectiveness of the HARQ transmission can be improved. In some embodiments, the cross-carrier HARQ transmission is performed by the process based on combined HARQ or Virtual Component Carrier (VCC), thereby reducing the signaling overheads for supporting the cross-carrier HARQ transmission.

DESCRIPTION OF DRAWINGS

Other features, objects and advantages of the present application will be more apparent with reading a detailed description of the non-limiting embodiments set forth below with reference to the attached drawings, in which:

FIG. 1 illustrates a schematic diagram of a configuration of an FDD wireless frame in prior art;

FIG. 2 illustrates a schematic diagram of a configuration of a TDD wireless frame in prior art;

FIG. 3 illustrates an example of signal flow of a cross-carrier HARQ transmission according to an embodiment of the present application;

FIG. 4 illustrates a schematic graph of VCC according to an embodiment of the present application;

FIG. 5 illustrates another schematic graph of VCC according to an embodiment of the present application;

FIG. 6 illustrates a schematic diagram of an implementation of processing HARQ-ACK transmission according to an embodiment of the present application;

FIG. 7 illustrates a schematic diagram of another implementation of processing HARQ-ACK transmission according to an embodiment of the present application; and FIG. 8 illustrates a schematic block diagram of an apparatus which can be configured to implement an exemplary embodiment of the present application.

BEST MODE

Hereinafter, the present application will be further described in detail in conjunction with the accompanying drawings and embodiments. It can be understood that specific embodiments described herein are intended to explain the relevant invention only, rather than to limit the invention.

In addition, it should be noted that only a portion related to the relevant invention is shown in the accompanying drawings for ease of description.

It should be noted that the embodiments, and features in the embodiments of the present application may be combined in the case of no confliction. Hereinafter, the present application will be explained in detail with reference to the accompanying drawings in connection with the embodiments.

In the following description, Base Station (BS) is an access device for accessing communication apparatuses to a cellular network, and it is used to allocate communication resources to the communication apparatuses. The Base Station may be any one of the following physical devices: an enhanced Node B (eNB), a Node B, a wireless electrical access unit, a base station controller, a base transceiver station, etc. The communication apparatuses can be any apparatuses intended to access service via an access network and can be configured to communicate through the access network. For example, the communication apparatuses can include, but not limit to: a User Terminal (UE), a Mobile Station (MS), a cellular phone, a smart phone, computer, or a multimedia system provided with a communication function. It should be noted that in the following description, terms "communication apparatus", "user equipment" and "user terminal" can be used exchangably.

It also should be noted that although embodiments are described in an LTE/LTE-A type cellular network, for the purpose of illustration, those skilled in the art can recognize that the disclosed embodiments can be applied to cellular networks in other types.

In order to use HARQ transmission sufficiently to improve the performance of data transmission, it is desired to support a quick re-transmission on another component carrier for a TB that hasn't been successfully transmitted yet. Therefore, the embodiments of the present application provide a solution of processing cross-carrier HARQ transmission.

FIG. 3 illustrates an example of the signal flow of processing cross-carrier HARQ transmission between User Terminal (UE) and Base Station (eNB) according to an embodiment of the present application. Those skilled in the art can understand that for the purpose of example and ease of comprehension, one or more particular technical details are illustrated and described in the following description, but the embodiment of the present application can also be implemented without these features.

As shown in FIG. 3, in step 301, a base station transmits configuration information of a cross-carrier HARQ transmission to a user terminal UE. In other words, the user terminal UE receives configuration information of the cross-carrier HARQ transmission from a base station. Particularly, during the cross-carrier HARQ transmission, an initial transmission and a re-transmission of the same HARQ process can be performed on different physical component carriers. It can be understood that, depending on sub-frames of actually configured and available physical component carriers, the initial transmission and the re-transmission of the same HARQ process can be performed on different physical component carriers and also on the same physical component carrier, thereby achieving the flexibility of the HARQ transmission. The configuration information can configure UE to perform a data transmission based on the cross-carrier HARQ transmission. In other words, the configuration information can indicate or configure UE with a mechanism of processing the cross-carrier HARQ transmission. For example, the configuration information can give indication of processing the cross-carrier HARQ transmission by configuring UE with a mechanism of VCC (Virtual Component Carrier), and can also give indication of processing the cross-carrier HARQ transmission by a mechanism of combining HARQ process, which will be described in detail hereinafter.

Next, in step 302, the base station transmits downlink control information to the UE. In other words, the user terminal UE receives the downlink control information from the base station. The downlink control information includes control information for the cross-carrier HARQ transmission. The downlink control information is used to allocate uplink channel resources or downlink channel resources. Based on different mechanisms of processing the cross-carrier HARQ transmission, the downlink control information can include, for example, VCC index information or combined HARQ process identification (ID) information, etc. The above control information is mainly used to identify the VCC index or the combined HARQ process identification (ID), so as to determine the VCC or the combined HARQ process corresponding to scheduled transmitting data.

Finally, in step 303, the base station and the user terminal can perform the cross-carrier HARQ transmission according to the configuration information and the downlink control information. The cross-carrier HARQ transmission can include an uplink cross-carrier HARQ transmission and a downlink cross-carrier HARQ transmission.

For example, during the downlink cross-carrier HARQ transmission, UE receives the downlink data according to the downlink control information, such as the DL grant, and processes the received downlink data according to the DL grant. For example, according to the indication of the DL grant, it may be needed to combine soft information that is directed to the same data but comes from different CCs and is transmitted two or more times, and then decode the data. That is to say, different times of transmission of the same scheduling data can be at PDSCH of different CCs.

For another example, during the uplink cross-carrier HARQ transmission, the UE transmits the uplink data according to the downlink control information, such as the UL grant, and handles the transmitted uplink data according to the UL grant. For example, according to the indication of the UL grant, it may be needed to map different times of transmission for the same data to different CCs. That is to say, different times of transmission of the same scheduling data can be at PUSCH of different CCs.

For ease of description, in the following description, the embodiments of the present application are set forth by taking the example of the downlink cross-carrier HARQ transmission. Those skilled in the art can understand that the features described with respect to the downlink cross-carrier HARQ transmission can be applied to the uplink cross-carrier HARQ transmission correspondingly.

According to the existing HARQ transmission solution, the UE needs to transmit HARQ-ACK information, i.e., HARQ feedback, to the base station according to the number of physical CCs, and the signaling overheads are relatively high. In order to reduce the signaling overheads, the cross-carrier HARQ transmission provided by the present application can be implemented based on different mechanisms. Hereinafter, the exemplary implementation of the cross-carrier HARQ transmission according to the present application will be described in connection with particular embodiments.

Embodiment 1

In the present embodiment, the cross-carrier HARQ transmission is processed based on a mechanism of Virtual Component Carrier (VCC).

As mentioned previously, for a component carrier in an unlicensed band, the apparatus can only transmit data for a period of time upon occupying a channel, and then the channel needs to be released. Moreover, for different component carriers, the time at which a channel is obtained is usually different.

FIG. 4 illustrates a schematic diagram of an apparatus competing for channel resources on two component carriers. As shown in FIG. 4, the time at which the apparatus obtains a resource on component carrier 1 is different from time that the apparatus obtains a resource on component carrier 2. From the perspective of resource occupation, having the cross-carrier HARQ transmission supported equals to that the apparatus can occupy resources on a component carrier more intensively. Therefore, the channel resources occupied by the apparatus on two component carriers can be mapped more intensively to resources occupied by the apparatus on a virtual component carrier (VCC).

On the other hand, considering the randomness of competing for resources on two component carriers, the case of simultaneously occupying resources on both two component carriers may occur. FIG. 5 illustrates another schematic diagram of an apparatus competing for channel resources on two component carriers. As shown in FIG. 5, the total resources available for the apparatus sometimes may come from more than one component carriers. For example, both the component carriers 1 and 2 are available. However, as long as the base station prevents a portion of two component carriers that the available channel overlaps from scheduling data for the same UE, it is still believed that the resources can be treated as, from the UE side, being on one component carrier. In the case that the number of the apparatuses participating in competition on each component carrier is large, the probability that above situation occurs decreases accordingly. Accordingly, influence on UE transmission rate is reduced. In other words, for a UE configured with cells having unlicensed bands, the number of the configured component carriers decreases.

In addition, if the volume of business of UE is not large, the UE will still occupy only a part of a sub-frame resource of each component carrier. That is to say, the proportion of time actually taken by a component carrier for data transmission of UE is less than 1 In other words, from the perspective of the UE side, the number of component carriers configured for the UE decreases. This problem is not specially solved in existing CA system.

Based on the above analysis, for a UE operating in a CA mode, although the UE is configured with N component carriers by RCC signaling, the proportion of time that above N component carriers actually allocates to the UE is small due to occupation of the channel or scheduling of the base station, and so on. Especially, a component carrier having unlicensed band can be actually used for a data transmission only in a part of time, and the more the number of apparatuses participating competition is, the smaller the proportion of time that an apparatus can occupy the channel is. From the perspective of the average effect on the UE side, the amount of data the UE can transmit during a period of time is reduced. Therefore, for a component carrier, the cross-carrier HARQ process may not need to be designed according to the fact that all time can be used to transmit data.

From this point, above N component carriers can be equivalently considered as that fact that M Virtual Component Carriers (VCC) are configured, and the proportion of time that these M VCCs actually allocate to the UE is large. It can be understood that M is less than or equals to N. Here, data transmitted on N component carriers configured for the UE can be considered to correspond to an initial transmission or an HARQ re-transmission of data of the above M VCCs. A plurality of rules can be made to configure the VCC, and the present application has no limitation to this aspect. As such, the behavior of the UE can be processed based on the number M of VCCs. That is to say, when the cross-carrier HARQ transmission is performed, for a datus, CCs on which physical channels of the initial transmission and the re-transmission of the datus are present can be different, but the same VCC can be used to identify the initial transmission and the re-transmission of this datus. In order to support the HARQ transmission and the re-transmission of the cross-carrier, an HARQ process is identified by both the VCC index and the HARQ process ID. As an example of the downlink data transmission, the data of the same VCC are allowed to be transmitted on PDSCH of different CCs. When receiving the downlink data, the UE can conduct HARQ incorporation on the initial transmission and the re-transmission of data of the same VCC and the same HARQ process ID.

Therefore, in the present embodiment, the configuration information transmitted by the base station to the user terminal indicates that the cross-carrier HARQ transmission is processed based on the virtual component carrier VCC, wherein the user terminal is configured with N physical component carriers and M virtual component carriers (VCC), and each VCC is used to identify the data transmission of one or more available sub-frames of a group of physical component carriers among the N physical component carriers. The data transmission identified by a VCC can be performed on any of a group of physical component carriers corresponding to the VCC. M and N are positive integers, and M is smaller than N. It can be understood that, depending on the particular configuration, one VCC may only identify the data transmission of one or more available sub-frames of one physical component carrier, that is, the initial transmission and the re-transmission of the same data identified by the VCC are performed on the one physical component carrier.

When N CCs are configured for the UE and the cross-carrier HARQ transmission for data of a VCC can be performed on any CC, each VCC must be allocated with a unique VCC index. When the N CCs configured for the UE are divided into several groups and the cross-carrier HARQ transmission is limited to being performed separately in each group, each VCC in a group must be allocated with a unique VCC index, but the VCC indexes in different groups may be the same or different.

For the processing method based on VCC, the number M of VCCs and parameters of each VCC need to be configured. The parameters of VCC can include, for example, Transmission Mode (TM), reference HARQ timing, maximum number ($M_{DL\_HARQ}$) of HARQ process, etc. Here, TM of VCC refers to the number of TBs supported by the VCCs in a sub-frame, that is to say, it means whether the number of TBs which the VCCs can transmit simultaneously in a sub-frame is 1 or 2.

The number M of VCCs and the parameter of each VCC can be configured by a plurality of methods.

In the first implementation, the base station transmits a high layer signaling to a user terminal UE, and the high layer signaling configures the number of VCCs of the UE and configures the parameter of each respective VCC.

In the second implementation, the base station transmits a high layer signaling to the user terminal UE, and the high layer signaling configures the number of VCCs of the UE and configures all VCCs to use the same parameter.

In the third implementation, when configuring each of N CCs of the UE, the base station indicates whether the configuration information of a CC is used to map the configuration information of a VCC. For example, one bit can be used for indicating this. For a CC which maps a VCC, the parameter of the corresponding VCC can be obtained according to the configuration information of this CC. Further, the number M of VCCs configured for the UE can be obtained according to the number of CCs which have mapped VCC in the configuration information of the N CCs. The indexes of the mapped VCCs can be included in the configuration information of M CCs, or the index of the corresponding VCC can be further determined according to the sequence of indexes of the M CCs corresponding to the VCC.

In the fourth implementation, the base station transmits a high layer signaling to the user terminal UE, and the high layer signaling configures the number M of VCCs of the UE, and deems that the configuration information of the first M CCs among N CCs configured for the UE map the parameters of the M VCCs sequentially.

When the cross-carrier HARQ transmission is performed, processes for DCI format, soft buffer, etc., may be involved. It can be understood that either or both of the above two processes can support the cross-carrier HARQ transmission, and the present application has no limitation to this aspect.

In order to support the cross-carrier HARQ transmission, it is needed to indicate VCCs corresponding to currently scheduled data. That is to say, it is needed to indicate a VCC index corresponding to the data transmission. The user terminal UE can determine the VCC index corresponding to the data transmission based on VCC index information received from the base station. A plurality of methods can be used to indicate the VCC index information.

In one implementation, the method of indicating the VCC index comprises adding the VCC index information to DCI scheduling the data transmition, for example, adding additional VCC index information domain, or re-using existing information domain to indicate the VCC index information, thereby indicating the VCC corresponding to the data transmission in a sub-frame.

In the other implementation, the method of indicating the VCC index comprises transmitting indicating information of a VCC index and applying it to continuous sub-frames of a component carrier. For example, for a cell having unlicensed bands, when channel occupation indication information of the cell is transmitted, which VCC the data transmission of all sub-frames of this channel occupation corresponds to is also indicated. The above indication information can also be achieved by the downlink control information, for example, using a DCI format of Common Search Space (CSS), wherein the number of bits of the DCI format equals to that of the DCI format 1A or 1C.

Through the above two methods, the VCC index information can indicate any one of: a VCC corresponding to the data transmission in a scheduled sub-frame; and a VCC corresponding to the data transmission in continuous sub-frames of a physical component carrier.

For the above two methods, assuming that the number of configured VCCs is M, $\lceil \log_2(M) \rceil$ bits of indication information can be used in the DCI. Here, when the value of M is smaller than that of N, the method of indicating the VCC index can reduce the bit overheads of the DCI format, compared to the method of distinguishing NCCs in the DCI.

Alternatively, for the above two methods, the number of bits needs to be used in DCI can be determined according to the maximum number $M_{max}$ of VCCs needing support. That is, the VCC index information is indicated by using $\lceil \log_2(M_{max}) \rceil$ bits. The number of bits so obtained is independent of the number of currently and actually configured VCCs, thereby keeping the number of bits in the DCI format unchanged. Due to occupation of channel or scheduling of base station, etc., the above maximum number of VCCs needing support is usually less than the number N of CCs that can be configured for the UE, thus the bit overheads can be reduced.

Alternatively or additionally, the cross-carrier HARQ transmission can comprise processing soft buffer based on the VCC. The processing of the soft buffer comprises two parts of contents, that is, rate match and storage of soft bit. Therefore, to process the soft buffer based on the VCC can comprise at least one of: processing the rate match according to the maximum number $M_{DL\_HARQ}$ of HARQ processes of the VCC and the number of TBs supported by the VCC in a sub-frame; and caching the soft bit according to the number M of VCCs, the maximum number $M_{DL\_HARQ}$ of HARQ processes of the VCC and the number of TBs supported by the VCC in a sub-frame.

As mentioned previously, the parameters of VCC can include, for example, Transmission Mode (TM), reference HARQ timing, maximum number ($M_{DL\_HARQ}$) of HARQ process, etc. The number M of VCCs and each parameter of the VCC can be configured by a plurality of methods.

Upon processing the soft buffer, it is needed to determine the maximum number $M_{DL\_HARQ}$ of HARQ processes of the VCC firstly. The maximum number $M_{DL\_HARQ}$ of HARQ processes of the VCC can be determined by any of the following methods.

In the first implementation, the high layer signaling is received from the base station. The maximum number $M_{DL\_HARQ}$ of HARQ processes of each VCC is configured by the high layer signaling, respectively.

In the second implementation, the high layer signaling is received from the base station, and the high layer signaling is configured with a maximum number $M_{DL\_HARQ}$ of HARQ processes, applies the maximum number $M_{DL\_HARQ}$ of HARQ processes to all VCCs. That is to say, the maximum number of HARQ processes of all VCCs is the maximum number $M_{DL\_HARQ}$ of HARQ processes configured by the high layer signaling.

In the third implementation, the maximum number $M_{DL\_HARQ}$ of HARQ processes of each VCC is pre-defined as a fixed value X, for example, X is defined as X=8.

In the fourth implementation, the maximum number $M_{DL\_HARQ}$ of HARQ processes of VCC mapped by a CC is determined by the maximum number of HARQ processes of the CC. When configuring each of N CCs for the UE, the base station indicates that whether configuration information of a CC is used to map the configuration information of a VCC. For example, the indication can be made by using one bit. For example, for a CC which maps a VCC, the maximum number $M_{DL\_HARQ}$ of HARQ processes of the corresponding VCC can be determined as the maximum number of HARQ processes of the CC.

In the fifth implementation, the number M of VCCs of the UE can be configured by using high layer signaling directly, and the maximum number $M_{DL\_HARQ}$ of HARQ processes of M VCCs is determined sequentially according to the maximum number of HARQ processes of the first M CCs among N CCs.

As such, in some embodiments, in processing rate match, during the processing of date of one corresponding VCC, soft buffer of each code block can be processed according to the maximum number $M_{DL\_HARQ}$ of HARQ processes of the VCC. For example, when the rate match is made for each code block of a TB, the size of the soft buffer of the code block is $$N_{cb} = \min\left(\left\lfloor \frac{N_{IR}}{C} \right\rfloor, K_w\right)$$

where, C is total number of code blocks divided by TB, and $K_w$ is total number of code bits output by a turbo code, $$N_{IR} = \left\lfloor \frac{N_{soft}}{K_C \cdot K_{MIMO} \cdot \min(M_{DL\_HARQ}, M_{limit})} \right\rfloor$$

where, $K_{MIMO}$ depends on a transmission mode of the VCC; for a transmission mode which supports 2 TBs, $K_{MIMO}=2$, and for a transmission mode which only supports 1 TB, $K_{MIMO}=1$; $M_{limit}$ is a constant, 8, and $K_C$ is a constant related to the capability category of the UE.

On UE side, when the decoding of a TB of a VCC fails, the soft bit cache can also be processed according to the maximum number $M_{DL\_HARQ}$ of HARQ processes of VCC. For example, at the side of UE, the soft buffer can be equally divided by the UE according to the number M of VCCs. Then, when the decoding of a code block of a TB fails, for each VCC and at least $K_{MIMO}\cdot\min(M_{DL\_HARQ}, M_{limit})$ TBs, the number of the soft bits saved at least for the code block is $$n_{SB} = \min\left(N_{cb}, \left\lfloor \frac{N_{soft}}{C \cdot M \cdot K_{MIMO} \cdot \min(M_{DL\_HARQ}, M_{limit})} \right\rfloor\right)$$

where, M is total number of VCCs. In particular, the soft bits $W_k W_{k+1}, \ldots, W_{mod(k+n_{SB}-1, N_{cb})}$, $w_k$ are recorded as a soft bit received by the UE, and k is the smaller index among the indexes of soft bits received by the UE. The base station can be based on above method in which UE saves a soft bit for a code block, thereby optimizing the HARQ re-transmission operation (HARQ IR) based on the additional redundance. With this method, the number of bits of the soft buffer which can be used by each code block increases because the number of VCCs is generally smaller than the total number of CCs configured for the UE, and this facilitates improving the link performance of the UE.

The method of processing the HARQ-ACK information transmission with respect to the mechanism based on the VCC, that is, the method of transmitting the HARQ feedback, is described below.

According to the method of processing HARQ-ACK by existing CA system, HARQ-ACK information of the data transmission on a plurality of component carriers is gathered on a component carrier, such as Pcell, for transmission. In some embodiments of the present disclosure, the transmitted data are divided into several data groups, wherein all HARQ feedbacks of data in a data group are mapped onto the same CC for transmission.

The data can be divided according to any one of: a CC used for transmitting data; and the corresponding VCC in transmitting data.

In particular, in one implementation, the transmitted data can be divided according to physical CCs used for transmission. That is to say, a data group corresponds to a group of physical CCs. The number of division can be larger than or equal to 1. The HARQ-ACK information is fed back with respect to each group of CCs, respectively. That is to say, the HARQ-ACK information of data in the same group of CCs is mapped onto a sub-frame of a certain CC for transmission. Assuming that the number of a group of CCs is $N_g$, the data transmission of the group of CCs is identified by using a group of VCC indexes. The range of the VCC indexes used by different groups of CCs can be the same or different. The number of VCCs corresponding to above group of $N_g$ CCs is $N_{gv}$, wherein $N_{gv}$ is smaller than or equals to $N_g$. If the CCs are not divided into groups, or are divided into only one group, the cross-carrier HARQ transmission for the data of a VCC can be performed on any CC, and each VCC must be allocated with a unique VCC index.

In the other implementation, the transmitted data can also be divided into groups according to VCC information of data transmission directly, without limiting that the data of the corresponding VCC is transmitted on which physical CC. The number of divided groups of VCCs is greater than or equals to 1. The HARQ-ACK information is fed back with respect to each group of VCCs, respectively. Each VCC must be allocated with a unique VCC index, and the HARQ-ACK information of data corresponding to a group of VCCs is mapped onto a sub-frame of a certian CC for transmission.

In some embodiments, the cross-carrier HARQ transmission can comprise: first, for a data group and an uplink sub-frame of CC for transmitting the HARQ-ACK information, a set of downlink sub-frames for feeding back the HARQ-ACK information on the uplink sub-frame is determined; next, in the above set of downlink sub-frames, according to the number of VCCs corresponding to the data group, a size of a VCC binding window of a sub-frame n for transmitting HARQ-ACK information, and the number of TBs supported by the VCC in a sub-frame, the number of bits for HARQ-ACK transmission is determined, and the sequence of each piece of HARQ-ACK information is determined. Next, the HARQ-ACK information of the data group can be fed back. For example, the HARQ-ACK transmission method in the existing CA system can be re-used.

In particular, according to the above method of dividing group based on CC or VCC, the HARQ-ACK transmission method for a group of CCs or VCCs is described below.

In one implementation, for a uplink sub-frame n of CCs for transmitting HARQ-ACK information, a set of downlink sub-frames of each of the group of CCs that need to feed back the HARQ-ACK information on the uplink sub-frame n are determined firstly. For downlink data transmission of a CC, a binding window mapped to the uplink sub-frame n can still be determined according to the reference HARQ timing of the CC. That is to say, HARQ-ACK of the data of sub-frames of the CC within the binding window is transmitted on the uplink sub-frame n. The reference HARQ timing of each CC can be the same or different.

Next, for the HARQ-ACK information which needs to be fed back on the uplink sub-frame n, the HARQ-ACK transmitting method is determined according to the VCC information of the corresponding data transmission. In particular, according to the number $N_g$, of VCCs, the size of the binding window of each VCC, and the number of TBs of each VCC in a sub-frame, the number of bits for the HARQ-ACK transmission and the sequence of each HARQ-ACK bit can be determined. Particularly, for the uplink sub-frame n, the size of the binding window corresponding to a VCC can be determined according to the reference HARQ timing of the VCC, or, for the uplink sub-frame n, the size of the binding window corresponding to a VCC can also be configured by a high layer signaling.

In another implementation, for the data transmission of a sub-frame of a CC, the uplink sub-frame for the HARQ-ACK transmission can be determined according to the referential HARQ-ACK timing of the corresponding VCC. In this implementation, it is needed to ensure that the HARQ-ACK timing according to VCC can be mapped to the uplink sub-frame that carries the HARQ-ACK component carrier. In other words, for the data transmission of a sub-frame of a CC, it is not needed to care about the reference HARQ timing of the CC, instead, the timing of the uplink sub-frame of the HARQ-ACK transmission of the data is determined according to the reference HARQ timing of VCC corresponding to each datus directly. The reference HARQ timing of each VCC can be the same or different.

Next, for the HARQ-ACK information which needs to be fed back on the uplink sub-frame n, the HARQ-ACK transmission method is determined according to the VCC information transmitted by the corresponding data. In particular, according to the number $N_{gv}$ of VCCs, the size of the binding window of each VCC, and the number of TB of each VCC in a sub-frame, the number of bits for the HARQ-ACK transmission and the sequence of each HARQ-ACK bit can be determined. Particularly, the size of the binding window of the uplink sub-frame n corresponding to a VCC can be determined according to the reference HARQ timing of the VCC.

In some embodiments, determining the sequence of each piece of HARQ-ACK information can comprise: sequencing the HARQ-ACK information according to the index sequence of VCC; and a plurality of HARQ-ACK information of the same VCC is sequenced according to the downlink allocation index DAI of VCC, wherein the DAI indentifies the transmission sequence of a plurality of data scheduled on a VCC.

In particular, when the data of a plurality of sub-frames corresponding to the same VCC is scheduled in the uplink sub-frame n, the DAI information needs to be further indicated. Particularly, the DAI does not indentify the data transmission of a plurality of sub-frames scheduled on a CC, instead it identifies a plurality of data transmissions scheduled on a VCC. For example, in all downlink sub-frames corresponding to the same VCC and needing feedback of the HARQ-ACK information on the uplink sub-frame n, the DAI equals to the total number of DL grants that the VCC index has transmitted before the current timing of the sub-frame. Here, on a sub-frame, corresponding one VCC index can be limited, and data can be scheduled on at most one CC; or on a sub-frame, it may also be allowed that the data of the same VCC index is scheduled on a plurality of CC indexes. If it is allowed that the data corresponding to the same VCC is scheduled on a plurality of CCs at the timing of one sub-frame, it can be configured that DL grant of the above data of the plurality of CCs is scheduled to occupy continuous DAI in the sub-frame, and the minimum value of these DAI equals to the total number of the DL grants corresponding to VCC that has been scheduled before the sub-frame and adds 1. As such, the HARQ-ACK information of the corresponding one VCC can be sequenced according to the sequence of DAI of VCC. When data of at most one sub-frame of the corresponding one VCC can be scheduled on the uplink sub-frame n, DAI can still be transmitted, that is, the value of the DAI can only be 1; or although the DAI information domain is included in DCI, it is kept from using; or it is also unnecessary to have the DAI information domain included in DCI, thereby reducing the number of bits of the DCI. For the uplink sub-frame n, each piece of HARQ-ACK information is sequenced according to the sequence of VCC indexes, and each piece of HARQ-ACK information corresponding to the same VCC can be sequenced according to the sequence of DAI. Here, if the corresponding one VCC has HARQ-ACK of the data in semi-persistent scheduling, it mapps to a fixed location, for example, it can be arranged before HARQ-ACK of all data in dynamic scheduling of this VCC, or it can map onto the last location of the binding window of this VCC.

For the method of determining a set of the downlink sub-frame for transmitting HARQ-ACK on the uplink sub-frame n according to the referential HARQ-ACK timing of physical CCs, HARQ-ACK of corresponding one VCC can be sequenced according to the DAI sequence. Here, in the timing of a sub-frame, the data can be scheduled at most on one CC for corresponding one VCC index; or it may also be allowed that the data of the same VCC index is scheduled on a plurality of CCs.

For the method of determining a set of the downlink sub-frame for transmitting HARQ-ACK on the uplink sub-frame n according to the referential HARQ-ACK timing of VCC, in a sub-frame timing, assuming that the data can be scheduled at most on one CC for corresponding one VCC index, the corresponding HARQ-ACK can be obtained according to sub-frames of the binding window of VCC, thereby the HARQ-ACK information can be transmitted by using the method based on Channel Selection; or HARQ-ACK of corresponding one VCC can be sequenced according to the DAI sequence. Or in a sub-frame, it may also be allowed that the data of the same VCC index is scheduled on a plurality of CCs, and HARQ-ACK of corresponding one VCC can only be sequenced according to the DAI sequence, and it is needed to limit that the downlink data of W sub-frames can be scheduled at most at the binding window of a VCC, wherein W is the number of the downlink sub-frame of the binding window of the VCC.

As mentioned above, the parameters of VCC can include, for example, Transmission Mode (TM), reference HARQ timing, maximum number ($M_{DL\_HARQ}$) of HARQ processes, etc. The number M of VCCs and each parameter of the VCC can be configured by a plurality of methods. The method of determining the reference HARQ timing of the VCC is described below.

In the first implementation, the high layer signaling is received from the base station, and the high layer signaling configures a reference HARQ timing of each respective VCC.

In the second implementation, the high layer signaling is received from the base station, and the high layer signaling configures a reference HARQ timing and applies the reference HARQ timing to all VCCs.

In the third implementation, the reference HARQ timing of VCC mapped by a CC is determined according to the reference HARQ timing of the CC. In particular, whether the configuration information of a CC is used to map the configuration information of a VCC can be indicated when each of N CCs of the UE is configured. For a CC which maps a VCC, the reference HARQ timing of the corresponding VCC is determined according to the reference HARQ timing of the CC.

In the fourth implementation, the number M of VCCs of UE is configured by using high layer signaling directly, and it is deemed that the reference HARQ timing of the first M CCs among N CCs configuring the UE corresponds to the reference HARQ timing of M VCCs sequentially. That is, the reference HARQ timing of M VCCs is determined sequentially according to the reference HARQ timing of the first M CCs among the N CCs.

The above reference HARQ timing may refer to FDD timing, the timing of HARQ of 7 kinds of TDD uplink and downlink configurations, the timing of HARQ of FDD Scell defined by TDD-FDD CA system with respect to TDD Pcell and FDD Scell, or other newly defined timing relationships.

FIG. 6 illustrates a schematic diagram of one implementation of processing HARQ-ACK transmission according to an embodiment of the present application.

As shown in FIG. 6, it is assumed that HARQ-ACK information of data of 5 CCs will be transmitted on cell 1 (i.e., component carrier 1), and the number of the configured VCCs is 3. The binding window mapped to the uplink sub-frame is determined according to the reference HARQ timing of each physical CC. In the example of FIG. 6, the reference HARQ timing of cell 1 is TDD uplink and downlink configuration 1; the reference HARQ timing of cell 2 is TDD uplink and downlink configuration 2; and the reference HARQ timing of cells 3-5 is the timing of HARQ defined by TDD-FDD CA system using an LTE system, in particular, the timing of HARQ of FDD Scell when Pcell is TDD uplink and downlink configuration 1. Therefore, the binding windows of different CCs can not be overlapped completely.

In FIG. 6, after the binding window of each CC corresponding to an uplink sub-frame is determined, the HARQ-ACK information of each scheduled downlink data can be sequenced according to their VCC index and DAI information. For VCC 0, data of 3 sub-frames are scheduled, and the DAI thereof is set to be 1, 2 and 3, respectively; For VCC 1, data of 2 sub-frames are scheduled, and the DAI thereof is set to be 1 and 2, respectively; For VCC 2, data of 2 sub-frames are scheduled, and the DAI thereof is set to be 1 and 2, respectively. Here, assuming that the size of the binding window of VCC is 3, the method in which the size of the binding window is 3 and there are 3 CCs can be re-used to feed back the HARQ-ACK information.

FIG. 7 illustrates a schematic diagram of another implementation of processing the HARQ-ACK transmission according to an embodiment of the present application.

As shown in FIG. 7, it is still assumed that the HARQ-ACK information of data of 5 CCs will be transmitted on the cell 1, and the number of the configured VCCs is 3. Here, it is assumed that 3 VCCs use the same reference HARQ timing, that is, the HARQ timing of FDD Scell when Pcell is TDD uplink and downlink configuration 1 in LTE TDD-FDD CA system. Accordingly, the binding windows of 3 VCCs are overlapped completely. According to the binding window of a VCC, all HARQ-ACK information scheduled in the range of the binding window and corresponding to the VCC data is fed back on the uplink sub-frame corresponding to the binding window. In FIG. 7, corresponding to the uplink sub-frame for feeding back HARQ-ACK, the size of the binding window of VCC is 3. For VCC 0, data of 2 sub-frames is scheduled, and the DAI thereof is set to be 1 and 2, respectively; For VCC 1, data of 3 sub-frames are scheduled, and the DAI thereof is set to be 1, 2 and 3, respectively; For VCC 2, data of only 1 sub-frame is scheduled, and the DAI thereof is set to be 1. Then, the method in which the size of the binding window is 3 and there are 3 CCs can be re-used to feed back the HARQ-ACK information.

Embodiment 2

In the present embodiment, the cross-carrier HARQ transmission is processed based on a mechanism of a combined HARQ process.

It can be known from the analysis in the previous embodiment 1, a component carrier having unlicensed band can be actually used for data transmission only in a period of time, and the more the number of apparatuses participating competition is, the smaller the proportion of time that an apparatus can occupy the channel is. Therefore, from the perspective of the average effect, the amount of data that the apparatus can transmit during a period of time decreases. For example, assuming that the data transmission of a component carrier needs 8 HARQ processes, and when all sub-frames of two component carriers can be scheduled for the same UE, the total number of HARQ processes of the UE is 16. As previously shown in FIG. 4 or FIG. 5, due to the occupation of the channel, although UE is configured with 2 component carriers, this can equal to the case that the UE is only configured with 1 component carrier. Therefore, the actual number of HARQ processes of UE decreases accordingly. For example, only 8 HARQ processes are needed.

In addition, in accordance with the analysis in the embodiment 1, if the volume of business of UE is not large, UE will occupy only a portion of the sub-frame resource of each component carrier. That is to say, the proportion of time actually taken by a component carrier for the data transmission of UE is smaller than 1. As such, from the perspective of the average effect on UE side, since the amount of data that UE can transmit during a period of time decreases, the HARQ processes which is N times about the number of HARQ processes of a single component carrier are not needed. This problem is not specially solved in the existing CA system.

Based on the above analysis, for a UE operating in a CA mode, although the UE is configured with N component carriers by RCC signaling, the proportion of time that above N component carriers actually allocates to the UE is small due to occupation of the channel or scheduling of the base station, and so on. Especially, a component carrier having unlicensed band can be actually used for data transmission only in a part of time, and the more the number of apparatuses participating competition is, the smaller the proportion of time that an apparatus can occupy the channel is. From the perspective of the average effect on UE side, the amount of data that the UE can transmit during a period of time is reduced.

In order to support cross-carriers with HARQ initial transmission and retransmission, a combined HARQ process can be defined. For a datus, the CC on which physical channels for the initial transmission and the re-transmission are present may be different, but the initial transmission and the re-transmission of this datus are identified by using the same combined HARQ process. As such, in scheduling data, a combined HARQ process ID is transmitted in a DCI format, so as to identify the combined HARQ process corresponding to the datus that is currently scheduled. The number of TBs which each combined HARQ process can carry on a sub-frame of a CC may be 1 or 2. Take downlink data transmission as an example, corresponding to the combined HARQ process, the HARQ initial transmission and the re-transmission for the same data are not limited to one CC any more, instead, they can be mapped to different CCs; UE can conduct HARQ incorporation on the initial transmission and the re-transmission of data of the combined HARQ processes with the same ID when receiving downlink data.

Therefore, in the present embodiment, configuration information transmitted by a base station to a user terminal indicates that the cross-carrier HARQ transmission is processed based on the combined HARQ process, wherein the user terminal is configured with N component carriers, which are divided into several groups of physical component carriers. A set of the combined HARQ processes is defined on each group of physical component carriers. The initial transmission and the retransmission of each combined HARQ process of the set can be mapped to different physical component carriers of the corresponding group of physical component carriers. In other words, the data transmission identified by a combined HARQ process can be performed on any one component carrier of the corresponding group of physical component carriers defining the set to which the combined HARQ process belongs, and also can be mapped to the same physical component carrier of the corresponding group of physical component carriers, thereby achieving the flexibility of the HARQ transmission.

In particular, for above N CCs configured for the UE, the number of divided groups equals to or larger than 1 Data of a group of CCs is not mapped onto other groups of CCs for HARQ re-transmission. The HARQ-ACK information of data of a group of CCs is mapped onto a sub-frame of a certain CC for transmission. On the above group of CCs, the HARQ initial transmission and re-transmission for the same data identified by using a combined HARQ process identification (ID) are not limited to being one physical component carrier any more, instead, they can be mapped to different CCs of the group of CCs. Here, when the cross-carrier HARQ is supported, the total number of combined HARQ processes is smaller than or equals to the sum of the maximum number of HARQ processes calculated individually for each CC. Assuming that some one group of CCs includes Ng CCs, the maximum number of HARQ processes of each CC is $M_k$, where k=0, 1, . . . Ng-1, respectively, and the total number of combined HARQ processes of the set of the combined HARQ processes defined on the group of CCs is smaller than or equals to $\Sigma(M_k)$. The total number Mg of the combined HARQ processes which need to be received by one UE can be configured by using high layer signaling directly. Or a number k can also be configured to indicate the number C·k of the combined HARQ processes, where C is a constant, for example, C equals to 8.

When the cross-carrier HARQ transmission is performed, processes for DCI format, soft buffer, etc., may be involved. It can be understood that either or both of the above two processes can support the cross-carrier HARQ transmission, and the present application has no limitation to this aspect.

In order to support the cross-carrier HARQ transmission, it is needed to indicate the combined HARQ process corresponding to currently scheduled data. That is to say, the HARQ process corresponding to the data transmission can be determined based on the combined HARQ process ID included in downlink control information transmitted by a base station. The base station can pre-inform the group of physical component carriers that is currently used to a user terminal UE. That is to say, in the following transmission, the base station only needs to indicate the combined HARQ process ID, thereby efficiently saving the signaling. In the following description, if there is no special indication, the processing of aspects is described with respect to the combined HARQ process defined on one known group of CCs.

For the above one group of Ng CCs, because the number of combined HARQ processes is generally large, the number of bits of information domain indicating the combined HARQ process ID in DCI format needs to be increased. In one implementation, the number of bits needed to be used in DCI can be determined according to the number $M_u$ of currently configured combined HARQ processes. That is to say, the number of bits is $\lceil \log_2(M_u) \rceil$. For example, the number $M_u$ of combined HARQ processes can be configured by high layer signaling directly. In another implementation, the number of bits needed to be used in DCI is determined according to the maximum number $M_{u-max}$ of combined HARQ processes needed to be supported. That is to say, the number of bits is $\lceil \log_2(M_{u-max}) \rceil$. As such, the number of bits so obtained is independent of the number of combined HARQ processes currently and actually configured, thereby keeping the the number of bits in DCI format unchanged. Due to occupation of channel or scheduling of base station, etc., the above maximum number of combined HARQ process ID needing support is need not be calculated according to the case that all sub-frames of all CCs are simultaneously allocated to the same CC, thus the bit overheads can be reduced.

Alternatively or additionally, the cross-carrier HARQ transmission can comprise processing soft buffer with respect to each combined HARQ process, respectively. The processing of the soft buffer comprises two parts of contents, that is, rate match and the storage of soft bit. Therefore, processing the soft buffer with respect to each combined HARQ process respectively can comprise at least one of the following items: the rate match is processed according to the maximum number $M_{DL\_uHARQ}$ of HARQ process of one combined HARQ process and the number of TBs supported on one sub-frame of the physical component carrier to which the combined HARQ process is mapped; the soft bit is cached according to the total number of combined HARQ process of N configured physical component carriers and the number of TBs supported on one sub-frame of the physical component carrier to which the combined HARQ process is mapped; and the soft bit is cached according to the number G of the groups of physical component carriers, the number $M_u$ of combined HARQ processes of the collection to which a combined HARQ process belongs, and the number of TBs supported on one sub-frame of the physical component carrier to which the combined HARQ process is mapped.

In particular, in order to handle the soft buffer, it is needed to determine the maximum number $M_{DL\_uHARQ}$ of HARQ processes of a combined HARQ process and the number of TBs supported by one sub-frame mapped to CC. The maximum number $M_{DL\_uHARQ}$ of HARQ processes of a combined HARQ process can be determined by using a plurality of methods.

In the first implementation, it is determined by a high layer signaling transmitted by the base station, wherein the high layer signaling configures the maximum number $M_{DL\_uHARQ}$ of HARQ processes of each combined HARQ process, respectively.

In the second implementation, it is determined by a high layer signaling transmitted by the base station, wherein the high layer signaling configures a maximum number $M_{DL\_uHARQ}$ of HARQ processes, and applies the maximum number $M_{DL\_uHARQ}$ of HARQ processes to all combined HARQ processes.

In the third implementation, the maximum number $M_{DL\_uHARQ}$ of HARQ processes of each combined HARQ process is pre-defined as a fixed value X. For example, the maximum number $M_{DL\_uHARQ}$ of HARQ processes of each combined HARQ process is pre-defined as 8.

In the fourth implementation, the maximum number $M_{DL\_uHARQ}$ of HARQ processes of the combined HARQ process is determined according to $M_{DL\_HARQ}$ of the HARQ timing of CC on which the HARQ-ACK transmission is present.

In the fifth implementation, it is determined according to the maximum number $M_{DL\_HARQ}$ of HARQ processes of the reference HARQ timing of the physical component carrier to which current data transmission of the combined HARQ process is mapped.

In the sixth implementation, it is determined according to the maximum number $M_{DL\_HARQ}$ of HARQ processes of the reference HARQ timing of the physical component carrier to which the initial transmission of current data of the combined HARQ process is mapped.

As such, in some embodiments, in processing rate match, during the processing of date of one corresponding combined HARQ process, soft buffer of each code block can be processed according to $M_{DL\_uHARQ}$ of the combined HARQ processes and the number of TBs. For example, for one combined HARQ process, when the rate match is made for each code block of one TB, the size of the soft buffer of the code block is $$N_{cb} = \min\left(\left\lfloor \frac{N_{IR}}{C} \right\rfloor, K_w\right)$$

where, C is the total number of the code blocks divided by TB, and $K_w$ is the total number of code bits output by a turbo code, $$N_{IR} = \left\lfloor \frac{N_{soft}}{K_C \cdot K_{MIMO} \cdot \min(M_{DL\_uHARQ}, M_{limit})} \right\rfloor$$

where, $K_{MIMO}$ equals to the number of TBs which can be supported by the combined HARQ processes in one sub-frame of one CC, $M_{limit}$ is a constant, such as 8, and $K_C$ is a constant related to the capability category of the UE. Therefore, the rate match is conducted for one code block according to the size $N_{cb}$ of the soft buffer.

On UE side, when the decoding of one TB fails, the soft bit cache can be processed according to the combined HARQ processes.

In one embodiment, on UE side, when the decoding of one TB fails, the soft buffer can be processed according to the total number $M_a$ of the combined HARQ processes of N configured physical component carriers and the number of TBs supported on one sub-frame of the physical component carrier to which the combined HARQ process is mapped. For example, for at least $\min(M_a, M_{alimit})$ TBs, when decoding of one code block of one TB fails, the number of the soft bits saved at least for the code block is $$n_{SB} = \min\left(N_{cb}, \left\lfloor \frac{N_{soft}}{C \cdot K_{MIMO} \cdot \min(M_a, M_{alimit})} \right\rfloor\right)$$

where, $M_{alimit}$ is the maximum number of combined HARQ processes requiring that UE can save the soft bits simultaneously. In particular, the soft bits $W_k W_{k+1}, \ldots, W_{mod(k+n_{SB}-1, N_{cb})}$, $w_k$ are recorded as one soft bit received by UE, and k is the smaller index among the indexes of soft bits received by UE. The base station can be based on the above method of saving the soft bit by the UE for the code block, thereby optimizing the HARQ re-transmission operation (HARQ IR) based on the additional redundance.

In the other implementation, on UE side, when decoding of one TB fails, the soft bit can be cached according to the number G of divided groups of physical component carriers (that is, the number G of groups making the combined HARQ operation individually), the number $M_u$ of combined HARQ processes of a set to which a combined HARQ process belongs, and the number of TBs supported on one sub-frame of the physical component carrier to which the combined HARQ process is mapped.

For example, for a group of CCs carrying out a combined HARQ process and for at least $\min(M_u, M_{ulimit})$ TBs, when decoding of one code block of one TB fails, the number of soft bits saved at least for the code block is $$n_{SB} = \min\left(N_{cb}, \left\lfloor \frac{N_{soft}}{C \cdot G \cdot K_{MIMO} \cdot \min(M_u, M_{ulimit})} \right\rfloor\right)$$

where, $M_{ulimit}$ is the maximum number of combined HARQ processes requiring that UE can save the soft bits simultaneously for a group of CCs carrying out the combined HARQ processes. In particular, the soft bits $w_k w_{k-1}, \ldots, w_{mod(k+n_{SB}-1, N_{cb})}$, $w_k$ are recorded as one soft bit received by the UE, and k is the smaller index among the indexes of soft bits received by the UE. The base station can be based on the above method of saving the soft bit by the UE for the code block, thereby optimizing the HARQ re-transmission operation (HARQ IR) based on additional redundance. With this method, because the number of the combined HARQ processes is generally smaller than the sum of the maximum number of HARQ processes calculated individually by each CC, the number of bits of the soft buffer which can be used by each code block increases, which facilitates improving the link performance of the UE.

For cross-carrier HARQ transmission based on a mechanism of the combined HARQ process, when it transmits the HARQ-ACK information, the feedback can be performed on a level of physical CC according to the existing method, the details of which are omitted here.

Embodiment 3

It can be known from the analysis in the previous embodiment 1, a component carrier having unlicensed band can be actually used for data transmission only in a period of time, and the more the number of apparatuses participating competition is, the smaller the proportion of time that an apparatus can occupy the channel is. Therefore, from the perspective of the average effect, the amount of data that the apparatus can transmit during a period of time decreases. For example, assuming that the data transmission of a component carrier needs 8 HARQ processes, and when all sub-frames of two component carriers can be scheduled for the same UE, the total number of HARQ processes of the UE is 16. As previously shown in FIG. 4 or FIG. 5, due to the occupation of the channel, although UE is configured with 2 component carriers, this can equal to the case that the UE is only configured with 1 component carrier. Therefore, the actual number of HARQ processes of UE decreases accordingly. For example, only 8 HARQ processes are needed.

In addition, in accordance with the analysis in the embodiment 1, if the volume of business of UE is not large, UE will occupy only a portion of the sub-frame resource of each component carrier. That is to say, the proportion of time actually taken by a component carrier for the data transmission of UE is smaller than 1. As such, from the perspective of the average effect on UE side, since the amount of data that UE can transmit during a period of time decreases, the HARQ processes which is N times about the number of HARQ processes of a single component carrier are not needed. This problem is not specially solved in the existing CA system.

Based on the above analysis, for a UE operating in a CA mode, although the UE is configured with N component carriers by RCC signaling, the proportion of time that above N component carriers actually allocates to the UE is small due to occupation of the channel or scheduling of the base station, and so on. Especially, a component carrier having unlicensed band can be actually used for data transmission only in a part of time, and the more the number of apparatuses participating competition is, the smaller the proportion of time that an apparatus can occupy the channel is. From the perspective of the average effect on UE side, the amount of data that the UE can transmit during a period of time is reduced.

For the methods of embodiments 1 and 2, by configuring VCC and a combined HARQ process, when the soft buffer is processed, it can operate according to the number of component carriers being smaller than N, or according to the number of HARQ processes being smaller than the sum of the maximum number of HARQ processes calculated individually by N CCs, thereby the number of bits of the soft buffer which can be used by each code block increases, which facilitates improving the link performance of the UE. These methods of processing the soft buffer are actually independent of VCC or the combined HARQ process, and can also be applied to the case where the cross-carrier HARQ transmission is not used.

In particular, the above N CCs configured for the UE can be divided into groups, the number of divided groups thereof equals to or larger than 1. Here, the division method can be that CCs of which the reference HARQ timing is identical are divided into a group, for example component carriers operating in the unlicensed band are in a group. This is because the maximum HARQ processes of CCs of which the reference HARQ timing is identical are the same, therefore it more facilitate sharing of the soft bit cache among CCs. This is because the maximum HARQ processes of CCs of which the reference HARQ timing is identical are the same, therefore it is more facilitate for the soft bit cache being shared among CCs implementally. However, the present invention does not limit particular division methods. On the above group of CCs, based on the above analysis, the amount of data that UE needs to receive during a period of time decreases due to occupation of the channel or scheduling of the base station, and so on, that is, the total number of HARQ processes used by UE is generally smaller than or equals to the sum of the maximum number of HARQ processes calculated individually by each CC, or the total number of TBs received by UE is generally smaller than or equals to the sum of the number of TBs calculated individually by each CC. For example, assuming that some one group of CCs includes Ng CCs, the maximum number of HARQ processes of each CC is $M_k$, where k=0, 1, ... Ng-1, respectively, and the total number of HARQ processes on the group of CCs used by UE is generally smaller than or equals to $$\sum_{k}(M_k).$$

For example, assuming that some one group of CCs includes Ng CCs, the number of TBs of the downlink transmission mode of each CC is $T_k$, and the maximum number of HARQ processes of each CC is $M_k$, where k=0, 1, ... Ng-1, respectively, and the total number of TBs on the group of CCs received by UE is generally smaller than or equals to $$\sum_{k}(M_k \cdot T_k).$$

The processing of the soft buffer comprises two parts of contents, that is, rate match and storage of soft bit.

For a CC or TB, when the soft buffer is processed, the maximum number $M_{vDL\_HARQ}$ of HARQ processes of parameters can be used, a method of determining the correct $M_{vDL\_HARQ}$ will be described below.

In the first implementation, for a group of CCs, the maximum number $M_{vDL\_HARQ}$ of HARQ processes is configured by high layer signalings respectively and applied to all data transmission of the group of CCs. For the CC which is not configured with $M_{vDL\_HARQ}$ by high layer signalings, $M_{vDL\_HARQ}$ equals to the maximum number of HARQ processes determined according to a reference HARQ timing thereof.

In the second implementation, the maximum number $M_{vDL\_HARQ}$ of HARQ processes can also be configured by high layer signalings and applied to all data transmission of NCCs.

In the third implementation, the maximum number $M_{vDL\_HARQ}$ of HARQ processes is pre-defined as a fixed value and applied to the HARQ processes of N CCs. For example, $M_{vDL\_HARQ}$ equals to 8, or $M_{vDL\_HARQ}$ is an integer less than 8.

In the fourth implementation, $M_{vDL\_HARQ}$ can equal to the maximum number of HARQ processes determined according to a reference HARQ timing of the CC where data transmission exists. With this method, in performing rate match, $M_{vDL\_HARQ}$ of different CCs can be different.

In processing rate match and storing soft bits, the methods for determining $M_{vDL\_HARQ}$ corresponding to two operations may be the same, or be different.

In some embodiments, in processing rate match, for a TB, soft buffer of each code block can be processed according to the corresponding maximum number $M_{vDL\_HARQ}$ of HARQ processes thereof and the number of TBs. For example, by using the above fourth method for determining $M_{vDL\_HARQ}$, the method of the current CA system for processing rate match is kept. For example, when the rate match is made for each code block of a TB, the size of the soft buffer of the code block is $$N_{cb} = \min\left(\left\lfloor \frac{N_{IR}}{C} \right\rfloor, K_w\right)$$

where, C is total number of code blocks divided by TB, and $K_w$ is total number of code bits output by a turbo code, $$N_{IR} = \left\lfloor \frac{N_{soft}}{K_C \cdot K_{MIMO} \cdot \min(M_{vDL\_HARQ}, M_{limit})} \right\rfloor$$

where, $K_{MIMO}$ equals to the number of TBs which can be supported by the sub-frame of CC where data transmission exists, $M_{limit}$ is a constant, for example 8, and $K_C$ is a constant related to the capability category of the UE. Thereby, the rate match is made for a code block according to the size $N_{cb}$ of the soft buffer.

In some embodiments, for a group of CCs, when UEs process the soft buffer, because the amount of data that UEs need to receive during a period of time decreases generally, TBs or HARQ processes of which the soft buffer is smaller can be assumed to need only, thereby the number of bits of the soft buffer which can be used by each code block increases, which facilitates improving the link performance of the UE.

The first method is to process the soft bit cache for a group of CCs according to $V_g$ CCs. In particular, for a group of CCs, if they are configured with the above equivalent number $V_g$ of component carriers, the group of CCs is processed according to the number of HARQ processes of $V_g$ CCs, and for the CC which is not configured with the equivalent number of component carriers, it is still an independent CC and processed according to the number of HARQ processes itself. For a group of CCs which are configured with the equivalent number of component carriers, although the base station still can schedule data transmission on any one of the group of CCs, when burst errors occur, UE can not cache soft bit information of all HARQ processes. Vg may be configured by high layer signaling, or is predetermined. Or, a referential number Vg_ref of the CCs is predetermined, if the group of CCs includes $N_g$ CCs, the number Vg of equivalent CCs follows Vg=min(Ng, Vg_ref). In particular, when all the CCs belong to one group, or in the case that no division is performed on the CCs, the number Vg of equivalent CCs follows Vg=min(N, Vg_ref), wherein N is a total number of CCs configuring UE.

On UE side, when the decoding of a TB of a CC fails, the soft buffer can be processed according to the sum $V_a$ of the equivalent number of component carriers corresponding to N component carriers, the maximum number $M_{vDL\_HARQ}$ of HARQ processes of the CC, and the number of TBs supported on a sub-frame of the CC. Here, when $V_a$ is accumulated to be calculated, for the group of CCs which are configured with the above equivalent number $V_g$ of component carriers, the number for accumulation is $V_g$; for the CC which is not configured with the equivalent number of component carriers, the number for accumulation is one. In particular, when all the CCs belong to one group, or in the case that no division is performed on the CCs, Va equals to the number Vg of equivalent CCs of this group of CCs. For example, UE can equally divide the soft buffer according to the equivalent number $V_a$ of component carriers for processing the soft bit cache, for Va CCs, when the decoding of a code block of a TB fails, for at least $K_{MIMO}$·min $(M_{vDL\_HARQ}, M_{limit})$ TBs of one CC, the number of the soft bits saved at least from the code block is $$N_{SB} = \min\left(N_{cb}, \left\lfloor \frac{N_{soft}}{C \cdot V_a \cdot K_{MIMO} \cdot \min(M_{vDL\_HARQ}, M_{limit})} \right\rfloor\right)$$

In particular, the soft bits $W_k, W_{k+1}, \ldots W_{mod(K+n_{SB}-1, N_{cr})}$, $w_k$ are recorded as a soft bit received by the UE, and k is the smaller index among the indexes of soft bits received by the UE. The base station can be based on above method in which UE saves a soft bit for a code block, thereby optimizing the HARQ re-transmission operation (HARQ IR) based on the additional redundancy. For example, with above first, second, or third method for determining $M_{vDL\_HARQ}$, the value of $K_{MIMO}$·min$(M_{vDL\_HARQ}, M_{limit})$ is the same for each CC, thus it is required to ensure that the number of cached TBs is constant, and the soft cache can be processed by UE accordingly. With this method, the number of bits of the soft buffer which can be used by each code block increases because the number of equivalent component carriers is generally smaller than the total number of CCs configured for the UE, and this facilitates improving the link performance of the UE.

The second method is to process the soft bit cache for a group of CCs according to the fact that a sub-frame includes Tg TBs. In particular, for a group of CCs, if they are configured with the above equivalent number of TBs, the number of TBs determined respectively by the transmission mode of a CC, that is the above parameter $K_{MIMO}$, is not any longer used upon processing the soft buffer, instead for the group of CCs, they are processed according to $T_g$ TBs included in a sub-frame; and for the CC which is not configured with the equivalent number of TBs, it is still an independent CC and processed according to the number of TBs determined by the transmission mode itself, that is $K_{MIMO}$. For a group of CCs which are configured with the equivalent number of TBs, although the base station still schedules according to the actual transmission mode of each CC so that more than $T_g$ TBs can be scheduled in a sub-frame, when burst errors occur, UE can not cache soft bit information of all TBs. Tg may be configured by high layer signaling, or is predetermined. Or, a referential TB number Tg_ref of the CCs is predetermined, if the sum of the number of TBs of each CC of above one group of CCs is TNg, the number Tg of equivalent CCs follows Tg=min (TNg, Tg_ref). In particular, when all the CCs belong to one group, or in the case that no division is performed on the CCs, the number Tg of equivalent CCs follows Tg=min(TN, Vg_ref), wherein TN is a total number of TBs of all CCs configuring UE in one sub-frame.

On UE side, when the decoding of a TB of a CC fails, the soft buffer can be processed according to the sum $T_a$ of the equivalent number of TBs corresponding to N component carriers for processing the soft bit cache in a sub-frame, and the maximum number $M_{vDL\_HARQ}$ of HARQ processes of the CC. Here, when $T_a$ is accumulated to be calculated, for the group of CCs which are configured with the above equivalent number $T_g$ of TBs, the number for accumulation is $T_g$; for the CC which is not configured with the equivalent number of TBs, the number for accumulation is $K_{MIMO}$ of the CC. In particular, when all the CCs belong to one group, or in the case that no division is performed on the CCs, Ta equals to the total number Tg of equivalent TBs of this group of CCs in one sub-frame. For example, UE can equally divide the soft buffer according to the equivalent number $T_a$ of TBs for processing the soft bit cache, for a group of CCs, according to the equivalent number $T_g$ of TBs thereof, when the) decoding of a code block of a TB fails, for at least $T_g$·min$(M_{vDL\_HARQ}, M_{limit})$ TBs, the number of the soft bits saved at least for the code block is $$n_{SB} = \min\left(N_{cb}, \left\lfloor \frac{N_{soft}}{C \cdot T_a \cdot \min(M_{vDL\_HARQ}, M_{limit})} \right\rfloor\right)$$

In particular, the soft bits $w_k w_{k-1}, \ldots w_{mod(k+n_{SB}-1,N_{cb})}$, $w_k$ are recorded as a soft bit received by the UE, and k is the smaller index among the indexes of soft bits received by the UE. The base station can be based on above method in which UE saves a soft bit for a code block, thereby optimizing the HARQ re-transmission operation (HARQ IR) based on the additional redundancy. For example, with above first, second, or third method for determining $M_{vDL\_HARQ}$, the value of $T_g \cdot \min(M_{vDL\_HARQ}, M_{limit})$ is the same for a group of CCs, thus for this group of CCs, it is required to ensure that the number of cached TBs is constant, and the soft cache can be processed by UE accordingly. With this method, the number of bits of the soft buffer which can be used by each code block increases because the equivalent number of TBs is generally smaller than the total number of TBs of the transmission mode configuring UE in a sub-frame, and this facilitates improving the link performance of the UE.

The third method is to process the soft bit cache for a group of CCs according to $M_g$ HARQ processes. In particular, for a group of CCs, if they are configured with the above equivalent number of HARQ processes, the group of CCs are processed according to $M_g$ HARQ processes; and for the CC which is not configured with the equivalent number of HARQ processes, it is still an independent CC and processed according to the maximum number of HARQ processes itself. For a group of CCs which are configured with the equivalent number of HARQ processes, although the base station still can schedule data transmission on any one sub-frame on any one of the group of CCs, when burst errors occur, UE can not cache soft bit information more than $M_g$ HARQ processes.

For a group of CCs, it can be that UE is configured directly with the equivalent total number $M_g$ of HARQ processes for processing the soft bit cache through high layer signalings; or a value k can also be configured through high layer signalings, thereby indicating that the equivalent number of HARQ processes is $M_g = C \cdot k$, where C is a constant, for example C equals to 8; or it is assumed that the maximum number of HARQ processes of CCs is the same and recorded as $M_{vDL\_HARQ}$, a value k can be configured through high layer signalings, thereby indicating that the equivalent number of HARQ processes is $M_g = k \cdot \min(M_{vDL\_HARQ}, M_{limit})$; or a value k can be configured, for the c-th of the group of CCs, the maximum number of HARQ processes thereof is recorded as $M_{cDL\_HARQ}$, then when the soft bits of TBs on the c-th CC are cached, it is assumed that the equivalent number of HARQ processes of the group of CCs is $M_g = k \cdot \min(M_{cDL\_HARQ}, M_{limit})$, here for different CCs of the group of CCs, $M_{cDL\_HARQ}$ can be different, thereby $M_g$ which is used upon processing the soft bit cache is also different; or, Mg may be predetermined; or, a referential HARQ process number Mg_ref is predetermined. If the sum of the number of HARQ processes of each CC of above one group of CCs is MNg, the number Mg of equivalent HARQ processes follows Mg=min(MNg, Mg_ref). It is recorded that above one group of CCs includes Ng CCs, and the largest number of the HARQ processes of the kth CC is $M_{DL\_HARQ,k}$, then $MNg = \sum_{k=0}^{Ng-1} M_{DL\_HARQ,k}$, or $$MNg = \sum_{k=0}^{Ng-1} \min(M_{DL\_HARQ,k}, M_{limit}).$$

In particular, when all the CCs belong to one group, or in the case that no division is performed on the CCs, the number Tg of equivalent HARQ processes follows Mg=min (MN, Mg_ref), wherein MN is a total number of HARQ processes of all CCs configuring UE.

On UE side, when the decoding of a TB fails, the soft buffer can be processed according to the total sum $M_a$ of the equivalent number of HARQ processes of configured N component carriers for processing the soft bit cache, and the number of TBs supported on a sub-frame of the CC where data transmission exists. Here, when $M_a$ is accumulated to be calculated, for the group of CCs which are configured with the above equivalent number $M_g$ of HARQ processes, the number for accumulation is $M_g$; for the CC which is not configured with the equivalent number of HARQ processes, the number for accumulation is $\min(M_{vDL\_HARQ}, M_{limit})$, and $M_{cDL\_HARQ}$ is the maximum number of HARQ processes of the CC. In particular, when all the CCs belong to one group, or in the case that no division is performed on the CCs, Ma equals to the number Mg of equivalent HARQ processes of this group of CCs. For example, when the decoding of a code block of a TB fails, for at least $\min(M_a, M_{alimit})$ HARQ processes, the number of the soft bits saved at least for the code block is $$n_{SB} = \min\left(N_{cb}, \left\lfloor \frac{N_{soft}}{C \cdot K_{MIMO} \cdot \min(M_a, M_{alimit})} \right\rfloor\right)$$

or $$n_{SB} = \min\left(N_{cb}, \left\lfloor \frac{N_{soft}}{C \cdot K_{MIMO} \cdot M_a} \right\rfloor\right)$$

where $M_{alimit}$ is the maximum number of HARQ processes requiring UE being capable of saving soft bits simultaneously. In particular, the soft bits $w_k w_{k+1}, \ldots, w_{mod(k+n_{SB}-1,N_{cb})}$, $w_k$ are recorded as a soft bit received by the UE, and k is the smaller index among the indexes of soft bits received by the UE. The base station can be based on above method in which UE saves a soft bit for a code block, thereby optimizing the HARQ re-transmission operation (HARQ IR) based on the additional redundancy.

In the other implementation, on UE side, when the decoding of a TB fails, the soft bits can be cached according to the group number G of the divided groups of physical component carriers, and the equivalent number $M_g$ of HARQ processes in a group for processing the soft bit cache, and the number of TBs supported on a sub-frame of the CC where data transmission exists. That is, the total soft bit display is equally divided into G components, then each component is further distributed to $M_g$ parallel HARQ processes in the group.

For example, for a group of CCs, when the decoding of a code block of a TB fails, for at least $\min(M_g, M_{glimit})$ HARQ processes, the number of the soft bits saved at least for the code block is $$n_{SB} = \min\left(N_{cb}, \left\lfloor \frac{N_{soft}}{C \cdot G \cdot K_{MIMO} \cdot \min(M_g, M_{glimit})} \right\rfloor\right)$$

$$\text{or, } n_{SB} = \min\left(N_{cb}, \left\lfloor \frac{N_{soft}}{C \cdot K_{MIMO} \cdot M_a} \right\rfloor\right).$$

where $M_{glimit}$ is the maximum number of parallel HARQ processes for the group of CCs requiring UE being capable of saving soft bits simultaneously. In particular, the soft bits, $w_k w_{k+1}, \ldots, w_{mod(k+n_{SB}-1,N_{cb})}$, $w_k$ are recorded as a soft bit received by the UE, and k is the smaller index among the indexes of soft bits received by the UE. The base station can be based on above method in which UE saves a soft bit for a code block, thereby optimizing the HARQ re-transmission operation (HARQ IR) based on the additional redundance.

With this method, the number of bits of the soft buffer which can be used by each code block increases because the equivelant number of HARQ processes is generally smaller than the sum of the maximum number of HARQ processes calculated individually for each CC, and this facilitates improving the link performance of the UE.

The fourth method is to process the soft bit cache for a group of CCs according to Bg TBs. In particular, for a group of CCs, if they are configured with the above equivalent number of TBs, the group of CCs is processed according to $B_g$ TBs; and for the CC which is not configured with the equivalent number of TBs, it is still an independent CC and processed according to the number of TBs itself, that is $\min(M_{cDL\_HARQ}, M_{limit})$, and $K_{MIMO}$ is the number of TBs for the transmission mode of the CC, $M_{cDL\_HARQ}$ the maximum number of HARQ processes of the CC. For a group of CCs which are configured with the equivalent number of component carriers, although the base station still can schedule data transmission on any one sub-frame on any one of the group of CCs, when burst errors occur, UE can not cache soft bit information more than $B_g$ TBs.

For a group of CCs, it can be that UE is configured directly with the equivalent total number $B_g$ of TBs for processing the soft bit cache through high layer signalings; or a value k can also be configured through high layer signalings, thereby indicating that the equivalent number of TBs is $B_g = C \cdot k$, where C is a constant, for example C equals to 8; or it is assumed that the maximum number of HARQ processes of the group of CCs is the same and recorded as $M_{gDL\_HARQ}$, a value k can be configured through high layer signalings, thereby indicating that the equivalent number of TBs is $B_g = k \cdot \min(M_{gDL\_HARQ}, M_{limit})$; or a value k can be configured, for the c-th of the group of CCs, the maximum number of HARQ processes thereof is recorded as $M_{cDL\_HARQ}$, then when the soft bits of TBs on the c-th CC are cached, it is assumed that the equivalent number of TBs of the group of CCs is $B_g = k \cdot \min(M_{cDL\_HARQ}, M_{limit})$, here for different CCs of the group of CCs, $M_{cDL\_HARQ}$ can be different, thereby $M_g$ which is used upon processing the soft bit cache is also different; or, Bg may be predetermined; or, a referential TB totality Bg_ref is predetermined. If the sum of the number of TBs of each HARQ process of each CC of above one group of CCs is BNg, the number Bg of equivalent TBs follows Bg=min(BNg, Bg_ref). It is recorded that above one goup of CCs includes Ng CCs, and the largest number of the HARQ processes of the kth CC is $M_{DL\_HARQ,k}$, and the number of TBs it can transmit in one sub-frame is $K_{MIMO,k}$, then $$BNg = \sum_{k=0}^{Ng-1} (K_{MIMO,k} \cdot M_{DL\_HARQ,k}), \text{ or}$$

$$BNg = \sum_{k=0}^{Ng-1} [K_{MIMO,k} \cdot \min(M_{DL\_HARQ,k}, M_{limit})].$$

In particular, when all the CCs belong to one group, or in the case that no division is performed on the CCs, the totality Mg of equivalent TBs follows Mg=min(BN, Bg_ref), wherein BN is a total number of TBs of each HARQ process of all CCs configuring UE.

On UE side, when the decoding of a TB fails, the soft buffer can be processed according to the sum $B_a$ of the equivalent number of TBs of configured N component carriers for processing the soft bit cache. Here, when $B_a$ is accumulated to be calculated, for the group of CCs which are configured with the above equivalent number $B_g$ of TBs, the number for accumulation is $B_g$; for the CC which is not configured with the equivalent number of TBs, the number for accumulation is $K_{MIMO} \cdot \min(M_{cDL\_HARQ}, M_{limit})$, and $M_{cDL\_HARQ}$ is the maximum number of HARQ processes of the CC. In particular, when all the CCs belong to one group, or in the case that no division is performed on the CCs, Ba equals to the number Bg of equivalent TBs of this group of CCs. For example, when the decoding of a code block of a TB fails, for at least $\min(B_a, B_{alimit})$ TBs, the number of the soft bits saved at least for the code block is $$n_{SB} = \min\left(N_{cb}, \left\lfloor \frac{N_{soft}}{C \cdot \min(B_a, B_{alimit})} \right\rfloor\right)$$

$$\text{or, } n_{SB} = \min\left(N_{cb}, \left\lfloor \frac{N_{soft}}{C \cdot B_a} \right\rfloor\right).$$

where $B_{alimit}$ is the maximum number of TBs requiring UE being capable of saving soft bits simultaneously. In particular, the soft bits $w_k w_{k+1}, \ldots w_{mod(k+n_{SB}-1,N_{cb})}$, $w_k$ are recorded as a soft bit received by the UE, and k is the smaller index among the indexes of soft bits received by the UE. The base station can be based on above method in which UE saves a soft bit for a code block, thereby optimizing the HARQ re-transmission operation (HARQ IR) based on the additional redundance.

In the other implementation, on UE side, when the decoding of a TB fails, the soft bits can be cached according to the group number G of the divided groups of physical component carriers, and the equivalent number $B_g$ of TBs in a group for processing the soft bit cache. That is, the total soft bit display is equally divided into G components, then each component is further distributed to $B_g$ TBs in the group.

For example, for a group of CCs, when the decoding of a code block of a TB fails, for at least $\min(B_g, B_{glimit})$ TBs, the number of the soft bits saved at least for the code block is $$n_{SB} = \min\left(N_{cb}, \left\lfloor \frac{N_{soft}}{C \cdot G \cdot \min(B_g, B_{glimit})} \right\rfloor\right)$$

or $$n_{SB} = \min\left(N_{cb}, \left\lfloor \frac{N_{soft}}{C \cdot G \cdot B_g} \right\rfloor\right)$$

where $M_{glimit}$ is the equivalent number of TBs for the group of CCs requiring UE being capable of saving soft bits simultaneously. In particular, the soft bits $w_k w_{k+1}, \ldots w_{mod(k+n_{SR}-1,N_{cb})}$, $w_k$ are recorded as a soft bit received by the UE, and k is the smaller index among the indexes of soft bits received by the UE. The base station can be based on above method in which UE saves a soft bit for a code block, thereby optimizing the HARQ re-transmission operation (HARQ IR) based on the additional redundance.

With this method, the number of bits of the soft buffer which can be used by each code block increases because the equivalent number of TBs is generally smaller than the sum of the number of TBs calculated individually for each CC, and this facilitates improving the link performance of the UE.

FIG. 8 illustrates a schematic block diagram of a physical apparatus 800 suitable to implement the exemplary embodiments of the present application. The physical apparatus 800 can be configured as a network side apparatus, such as a base station. The physical apparatus 800 can also be configured as a user side apparatus, such as a user terminal.

As shown in FIG. 8, the physical apparatus 800 comprise a processor 801, a memory 802 coupled to the processor 801, and a suitable radio frequency (RF) transmitter and receiver 804 coupled to the processor 801. The memory 802 stores program 803. The transmitter/receiver 804 is suitable for two-way wireless communication. It is noted that, the transmitter/receiver 804 has at least one antenna for assisting communication. In practice, the base station or UE may have a plurality of antennas. The physical apparatus 800 may be coupled to one or more external networks or systems, such as internetworks, through a data path.

The program 803 can include program instructions. When these program instructions are executed by an associated processor 801, they make the physical apparatus 800 operate according to the exemplary embodiments of the present application.

The embodiments of the present application can be implemented by the computer software which can be executed by the processor 801 of the physical apparatus 800, or by the hardware, or by the combination of the software and the hardware.

The memory 802 can be any memories of suitable type which are suitable for the local technical environment, and can be implemented by using any suitable data storage technologies, such as storage apparatus and system based on semiconductor, magnetic storage apparatus and system, optical storage apparatus and system, and fixed storage and mobile storage, which are only non-limiting examples. Although only one memory is illustrated in the physical apparatus 800, a plurality of memory cells which are physically individual may be present in the physical apparatus 800. The processor 801 may be any processors of suitable type which are suitable for the local technical environment, and may include one or more of the following items: general purpose computer, dedicated computer, micro-processor, digital signal processor (DSP), and processor based on architecture of multi-core processor, which are only non-limiting examples.

When the physical apparatus 800 is configured as a user side apparatus, that is, when the physical apparatus 800 is a user apparatus, in some embodiments, the receiver of the transmitter/receiver 804 is configured to receive configuration information of a cross-carrier HARQ transmission from a base station. Particularly, during the cross-carrier HARQ transmission, an initial transmission and a re-transmission of the same HARQ process can be performed on different physical component carriers.

The receiver of the transmitter/receiver 804 is also configured to receive downlink control information from the base station. The downlink control information include control information for the cross-carrier HARQ transmission.

The processor 801 is configured to control the transmitter/receiver 804 to perform the HARQ transmission according to the configuration information and the downlink control information.

When the physical apparatus 800 is configured as a network side apparatus, that is, when the physical apparatus 800 is a base station, in some embodiments, the processor 801 is configured to determine configuration information of the cross-carrier HARQ transmission. Particularly, during the cross-carrier HARQ transmission, an initial transmission and a re-transmission of the same HARQ process may be performed on different physical component carriers.

The transmitter of the transmitter/receiver 804 is configured to transmit the configuration information of the cross-carrier HARQ transmission to a communication apparatus.

The transmitter of the transmitter/receiver 804 is also configured to transmit the downlink control information to the communication apparatus.

The processor 801 is also configured to control the transmitter/receiver 804 to perform the HARQ transmission according to the configuration information and the downlink control information.

It should be understood that units included in the physical apparatus 800 are configured to implement the exemplary embodiments disclosed herein. Therefore, the above operation and feature described in connection with FIGS. 3-7 are also suitable for the physical apparatus 800 and units therein, and the detailed description thereof is omitted here.

As another aspect, the present application also provides a computer readable storage medium, which may be a computer readable storage medium included in the base station or the communication apparatus of the above embodiments or a computer readable storage medium which is present individually and not assembled in the apparatus. The computer readable storage medium is stored with one or more programs, which are used by one or more processors to execute cellular access method described in the present application.

The above description is an illustration of preferable embodiments of the present application and technical principles used. Those skilled in the art should understand that the inventive scope related to the present application is not limited to a technical solution formed by the specifical combination of above technical features, but should encompass other technical solutions formed by any combination of the above technical features or equivalent features thereof, without departing from the inventive concept, for example, the technical solution formed by mutually replacing above technical features with technical features disclosed in the present application (but not limited thereto) and having similar functions.

The invention claimed is:

1. A hybrid automatic repeat request (HARQ) transmission method for a communication apparatus, the method comprising:
receiving configuration information related to a HARQ transmission from a base station, wherein the configuration information includes information indicating a mechanism of virtual component carrier (VCC) or a mechanism of combining HARQ process;
receiving downlink control information including control information for the HARQ transmission from the base station, wherein the downlink control information for the HARQ transmission includes information of a VCC index or information of a combined HARQ process identification (ID), and wherein the downlink control information for the HARQ transmission is determined based on the information indicating the mechanism of VCC or the mechanism of combining HARQ process included in the configuration information; and performing the HARQ transmission according to the configuration information and the downlink control information, wherein an initial transmission and a re-transmission of the HARQ transmission are processed on different physical component carriers, and wherein the initial transmission and the re-transmission of the HARQ transmission are identified by using the same VCC index or the same combined HARQ process ID.

2. The method of claim 1, wherein the configuration information indicates that the HARQ transmission is processed based on the VCC, wherein the communication apparatus is configured with N physical component carriers and M VCCs, wherein each of the M VCCs is used to identify data transmission of one or more available sub-frames of a group of physical component carriers among the N physical component carriers, wherein the data transmission identified by a VCC among the M VCCs is performed on a physical component carrier of a group of physical component carriers corresponding to the VCC, wherein M and N are positive integers, and wherein M is smaller than N.

3. The method of claim 2, wherein performing the HARQ transmission according to the configuration information and the downlink control information comprises determining an index of the VCC corresponding to the data transmission based on the information of the VCC index received from the base station, and wherein the information of the VCC index indicates a VCC corresponding to data transmission in a scheduled sub-frame, or a VCC corresponding to data transmission in continuous sub-frames of a physical component carrier.

4. The method of claim 2, wherein the performing of the HARQ transmission according to the configuration information and the downlink control information comprises:

processing rate match according to a maximum number MDL_HARQ of HARQ processes of the VCC and a number of transport blocks (TBs) supported by the VCC in a sub-frame; or caching a soft bit according to a number M of VCCs, the maximum number MDL_HARQ of HARQ processes of the VCC and the number of TBs supported by the VCC in the sub-frame.

5. The method of claim 4, wherein the maximum number MDL_HARQ of HARQ processes of the VCC is determined by at least one of:

receiving a high layer signaling from the base station, wherein the high layer signaling configures the maximum number MDL_HARQ of HARQ processes of each respective VCC;

receiving a high layer signaling from the base station, wherein the high layer signaling configures the maximum number MDL_HARQ of HARQ processes and applies the maximum number MDL_HARQ of HARQ processes to all VCCs;

pre-defining the maximum number MDL_HARQ of HARQ processes of the each VCC as a fixed value;

determining the maximum number MDL_HARQ of HARQ processes of VCC mapped by the physical component carrier according to the maximum number of HARQ processes of the physical component carrier; or determining the maximum number MDL_HARQ of HARQ processes of the M VCCs sequentially according to the maximum number of HARQ processes of a first M physical component carriers among the N physical component carriers.

6. The method of claim 2, wherein transmitted data are divided into several data groups, and wherein all HARQ feedbacks of data in a data group are mapped onto a same physical component carrier for transmission.

7. The method of claim 6, wherein the performing of the HARQ transmission according to the configuration information and the downlink control information comprises:

determining a number of bits of a HARQ-ACK information and determining a sequence of respective HARQ-ACK information according to a number of VCCs corresponding to a data group, a size of a VCC binding window of a sub-frame n for transmitting the HARQ-ACK information, and a number of transport blocks (TBs) supported by the VCC in a sub-frame, wherein the size of the VCC binding window of the sub-frame n for transmitting the HARQ-ACK information is determined according to one of:

determining the size of the VCC binding window according to a reference HARQ timing of VCCs corresponding to the sub-frame n; or receiving a high layer signaling from the base station, wherein the high layer signaling configures the size of the VCC binding window.

8. The method of claim 7, wherein the determining of the sequence of the respective HARQ-ACK information comprises:

sequencing the HARQ-ACK information according to an index sequence of the VCC; and sequencing several HARQ-ACK information aiming at a same VCC according to a downlink allocation index (DAI) of the VCC, wherein the DAI identifies a sequence of a plurality of data transmissions scheduled on the VCC.

9. The method of claim 7, wherein the reference HARQ timing of VCCs is determined by one of:

receiving the high layer signaling from the base station, wherein the high layer signaling configures the reference HARQ timing of each respective VCC;

receiving the high layer signaling from the base station, wherein the high layer signaling configures the reference HARQ timing and applies the reference HARQ timing to all VCCs;

determining the reference HARQ timing of VCCs mapped by the physical component carrier according to the reference HARQ timing of the physical component carriers; or determining the reference HARQ timing of the M VCCs sequentially according to the reference HARQ timing of the first M physical component carriers among the N physical component carriers.

10. The method of claim 1,
wherein the configuration information indicates that the HARQ transmission is processed based on the combining HARQ process,
wherein the communication apparatus is configured with N physical component carriers, which are divided into several groups of physical component carriers,
wherein a set of combined HARQ processes is defined on each group of physical component carriers, and
wherein the initial transmission and the re-transmission of each of the set of combined HARQ processes are mapped to different physical component carriers of a group of physical component carriers.

11. The method of claim 10, wherein the performing of the HARQ transmission according to the configuration information and the downlink control information comprises at least one of:
processing a rate match according to a maximum number MDL_uHARQ of HARQ processes of the combining HARQ process and a number of transport blocks (TBs) supported on a sub-frame of the physical component carrier to which the combining HARQ process is mapped;
caching a soft bit according to a total number of combined HARQ processes of the N physical component carriers and the number of TBs supported on the sub-frame of the physical component carrier to which the combining HARQ process is mapped; or
caching the soft bit according to a number of the group of physical component carriers, a number of combined HARQ processes of a set to which the combining HARQ process belongs, and the number of TBs supported on the sub-frame of the physical component carrier to which the combining HARQ process is mapped.

12. The method of claim 10, wherein the maximum number MDL_uHARQ of HARQ processes of the combining HARQ process is determined by at least one of:
receiving a high layer signaling from the base station, wherein the high layer signaling configures the maximum number MDL_uHARQ of HARQ processes of each combined HARQ process, respectively;
receiving a high layer signaling from the base station, wherein the high layer signaling configures the maximum number MDL_uHARQ of HARQ processes, and applies the maximum number MDL_uHARQ of HARQ processes to all combined HARQ processes;
pre-defining the maximum number MDL_HARQ of HARQ processes of the each combining HARQ process as a fixed value;
determining according to the maximum number of HARQ processes of the reference HARQ timing of the physical component carrier to which current data transmission of the combining HARQ process is mapped; or
determining according to the maximum number MDL_HARQ of HARQ processes of a reference HARQ timing of the physical component carrier to which the initial transmission of current data of the combining HARQ process is mapped.

13. A method of processing a soft buffer for a hybrid automatic repeat request (HARQ) transmission, the method comprising:
receiving configuration information for processing soft bit cache from a base station, wherein the configuration information includes information indicating a mechanism of virtual component carrier (VCC) or a mechanism of combining HARQ process;
receiving downlink control information, wherein the downlink control information for the HARQ transmission includes information of a VCC index or information of a combined HARQ process identification (ID), and wherein the downlink control information for the HARQ transmission is determined based on the information indicating the mechanism of VCC or the mechanism of combining HARQ process included in the configuration information;
receiving downlink data according to the downlink control information from the base station; and
caching soft bits if wrong data is received,
wherein an initial transmission and a re-transmission of the HARQ transmission are processed on different physical component carriers, and
wherein the initial transmission and the re-transmission of the HARQ transmission are identified by using the same VCC index or the same combined HARQ process ID.

14. The method of claim 13, wherein the configuration information for processing the soft bit cache comprises at least one of:
configuring a maximum number of HARQ processes by high layer signalings for a group of physical component carriers (CCs) respectively;
configuring the maximum number of HARQ processes by high layer signalings and applying to all data transmission of N CCs;
pre-defining the maximum number of HARQ processes as a fixed value; or
determining the maximum number of HARQ processes according to a reference HARQ timing of a CC where data transmission exists.

15. The method of claim 14, wherein the caching of the soft bits comprises at least one of:
processing a group of CCs according to a number of equivalent CCs, according to a sum of an equivalent number of CCs corresponding to N physical component carriers for processing the soft bit cache, the maximum number of HARQ processes of the CC, and a number of transparent blocks (TBs) supported on a sub-frame of the CC;
processing the group of CCs according to the number of TBs, according to a sum of an equivalent number of TBs corresponding to the N physical component carriers for processing the soft bit cache in a sub-frame, and the maximum number of HARQ processes of the CC;
processing the group of CCs according to a number of equivalent HARQ processes, according to a sum of the equivalent number of HARQ processes of configured N physical component carriers for processing the soft bit cache, and the number of TBs supported on the sub-frame of the CC where data transmission exists;
processing the group of CCs according to the number of equivalent HARQ processes, according to a group number of the divided groups of physical component carriers, the equivalent number of HARQ processes in a group for processing the soft bit cache, and the number of TBs supported on the sub-frame of the CC where data transmission exists;
processing the group of CCs according to the number of equivalent TBs, according to sum of the equivalent number of TBs of configured N physical component carriers for processing the soft bit cache; or
processing the group of CCs according to the number of equivalent TBs, according to a group number of the divided groups of physical component carriers and the equivalent number of TBs in a group for processing the soft bit cache.

16. A communication apparatus for a hybrid automatic repeat request (HARQ) transmission, the apparatus comprising:
a receiver configured to:
  receive configuration information related to a HARQ transmission from a base station, wherein the configuration information includes information indicating a mechanism of virtual component carrier (VCC) or a mechanism of combining HARQ process, and
  receive downlink control information including control information for the HARQ transmission from the base station, wherein the downlink control information for the HARQ transmission includes information of a VCC index or information of a combined HARQ process identification (ID), and wherein the downlink control information for the HARQ transmission is determined based on the information indicating the mechanism of VCC or the mechanism of combining HARQ process included in the configuration information; and
a processor configured to perform the HARQ transmission according to the configuration information and the downlink control information,
wherein an initial transmission and a re-transmission of the HARQ transmission are processed on different physical component carriers, and
wherein the initial transmission and the re-transmission of the HARQ transmission are identified by using the same VCC index or the same combined HARQ process ID.

17. The apparatus of claim 16,
wherein the configuration information indicates that the HARQ transmission is processed based on the VCC,
wherein the communication apparatus is configured with N physical component carriers and M VCCs,
wherein each of the M VCCs is used to identify data transmission of one or more available sub-frames of a group of physical component carriers among the N physical component carriers,
wherein the data transmission identified by a VCC among the M VCCs is performed on a physical component carrier of a group of physical component carriers corresponding to the VCC,
wherein M and N are positive integers, and
wherein M is smaller than N.

18. The apparatus of claim 17,
wherein the processor is further configured to determine an index of the VCC corresponding to the data transmission based on the information of the VCC index received from the base station, and
wherein the information of the VCC index indicates a VCC corresponding to data transmission in a scheduled sub-frame, or a VCC corresponding to data transmission in continuous sub-frames of a physical component carrier.

19. The apparatus of claim 17, wherein the processor is further configured to:
process rate match according to a maximum number MDL_HARQ of HARQ processes of the VCC and a number of transport blocks (TBs) supported by the VCC in a sub-frame; or
cache a soft bit according to a number M of VCCs, the maximum number MDL_HARQ of HARQ processes of the VCC and the number of TBs supported by the VCC in the sub-frame.

20. The apparatus of claim 16,
wherein the configuration information indicates that the HARQ transmission is processed based on the combining HARQ process,
wherein the communication apparatus is configured with N physical component carriers, which are divided into several groups of physical component carriers,
wherein a set of combined HARQ processes is defined on each group of physical component carriers, and
wherein the initial transmission and the re-transmission of each of the set of combined HARQ processes are mapped to different physical component carriers of a group of physical component carriers.

* * * * *